(12) United States Patent
Tasman et al.

(10) Patent No.: US 7,116,640 B2
(45) Date of Patent: Oct. 3, 2006

(54) ARCHITECTURE AND MECHANISM FOR FORWARDING LAYER INTERFACING FOR NETWORKS

(76) Inventors: Mitchell Paul Tasman, 9 Hawthorne Pl., Apt. 3D, Boston, MA (US) 02114-2319; Jason Keith Redi, 16 Ridge Rd., Belmont, MA (US) 02478; David Spencer Pearson, 1601 Monument Ave., Bennington, VT (US) 05201

( * ) Notice: Subject to any disclaimer, the term of this patent is extended or adjusted under 35 U.S.C. 154(b) by 992 days.

(21) Appl. No.: 09/748,621

(22) Filed: Dec. 22, 2000

(65) Prior Publication Data

US 2002/0080755 A1    Jun. 27, 2002

(51) Int. Cl.
*H04Q 7/20* (2006.01)
(52) U.S. Cl. .................. 370/252; 370/349; 370/392
(58) Field of Classification Search ............. 370/252, 370/345, 349, 390, 392, 474, 475
See application file for complete search history.

(56) References Cited

U.S. PATENT DOCUMENTS

| | | | |
|---|---|---|---|
| 4,718,002 A | 1/1988 | Carr .......................... 364/200 |
| 5,243,592 A | 9/1993 | Perlman et al. ............... 370/17 |
| 5,353,283 A * | 10/1994 | Tsuchiya ..................... 370/392 |
| 5,412,654 A * | 5/1995 | Perkins ........................ 370/312 |
| 5,850,592 A | 12/1998 | Ramanathan ................... 455/7 |
| 5,881,246 A | 3/1999 | Crawley et al. ........ 395/200.68 |
| 5,913,921 A | 6/1999 | Tosey et al. ................. 709/220 |
| 6,028,857 A | 2/2000 | Poor .......................... 370/351 |
| 6,216,167 B1 | 4/2001 | Momirov | |
| 6,683,885 B1 | 1/2004 | Sugai et al. | |
| 6,836,463 B1 * | 12/2004 | Garcia-Luna-Aceves et al. .......................... 370/238 |
| 7,007,100 B1 * | 2/2006 | Doong et al. ................ 709/238 |
| 2002/0013856 A1 * | 1/2002 | Garcia-Luna-Aceves et al. ........................... 709/238 |
| 2002/0091855 A1 * | 7/2002 | Yemini et al. .............. 709/238 |

OTHER PUBLICATIONS

Moy, John, "Link-State Routing," Ch. 5, "Routing in Communications Networks," ed. Martha Steenstrup, Prentice Hall, 1995.

Lauer, Gregory S., "Packet Radio Routing," Ch. 11, "Routing in Communications," ed. Martha Steenstrup, Prentice Hall, 1995.

(Continued)

*Primary Examiner*—Melvin Marcelo
(74) *Attorney, Agent, or Firm*—Fish & Neave IP Group Ropes & Gray LLP

(57) ABSTRACT

A communications apparatus (2) in a communications network (100 or 110) is provided for communication among a plurality of communication apparatuses. The communications apparatus (2) routes messages for neighboring apparatuses. The communications apparatus (2) includes a memory (4, 7 or 8), a processor (3) and a transceiver (6). The memory has a plurality of routing managers (12, 13, and 14) stored thereon, and each manager maintains at least one network table including one or more entries. The processor 3 selects at least one network table from those maintained by the plurality of routing managers (12, 13 and 14) that are stored in the memory (4, 7 or 8), based on an address indicator and/or on a type-of-service of a message. The processor 3 extracts network information from the selected network table or tables. The processor (3) also controls transmission of the message according to the extracted network information. The transceiver (6) transmits and receives messages.

77 Claims, 12 Drawing Sheets

OTHER PUBLICATIONS

Hahn, J.J., et al., "Packet Radio Network Routing Algorithms: A Survey," IEEE Communications Magazine, vol. 22, No. 11, Nov. 1984, pp. 41-47.

Kahn, R.E., "The Organization of Computer Resource into a Packet Radio Network," IEEE Trans. On Communication, vol. COM-25, No. 1, Jan. 1977, pp. 169-178.

* cited by examiner

FIG. 5

| TOS FIELD | UNICAST FORWARDING TABLE NUMBER |
|---|---|
| 0 | UNICAST TABLE i |
| ... | ... |
| MAXTOS (=255) | UNICAST TABLE j |

FIG. 6

NEXT-HOP TABLE FOR FORWARDING TABLE NUMBER t

| DEST. NODE NUMBER | NEIGHBOR INDEX |
|---|---|
| 1 | NEIGHBOR TABLE t INDEX i |
| ... | ... |
| MAXNODES (OR LESS) | NEIGHBOR TABLE t INDEX j |

FIG. 7

NEIGHBOR TABLE FOR FORWARDING TABLE t

| NEIGHBOR INDEX | NEXT HOP NODE NUMBER | RADIO PROFILE | FLAGS |
|---|---|---|---|
| i | NEIGHBOR ADDRESS k | RADIO PROFILE INDEX n | (FOR FUTURE EXPANSION) |
| ... | ... | ... | ... |
| j | NEIGHBOR ADDRESS m | RADIO PROFILE INDEX p | ... |

RADIO PROFILE TABLE FOR FORWARDING TABLE t

| RADIO PROFILE INDEX | ARRAY OF OPAQUE BYTES |
|---|---|
| n | RADIO PROFILE i |
| ... | ... |
| p | RADIO PROFILE j |

FIG. 8

TOS TO BROADCAST RADIO PROFILE INDEX TABLE

| TOS FIELD | BROADCAST RADIO PROFILE INDEX |
|---|---|
| 0 | BROADCAST RADIO PROFILE INDEX n |
| ... | ... |
| MAXTOS (= 255) | BROADCAST RADIO PROFILE INDEX p |

FIG. 10

| TOS FIELD | QUEUING DISCIPLINE DESCRIPTOR |
|---|---|
| 0 | QUEUING DISCIPLINE i |
| ..... | ..... |
| MAXTOS (=255) | QUEUEING DISCIPLINE j |

FIG. 11

| FLAGS | | NODE |
|---|---|---|
| DATA RATE | FEC CODING | PRIORITY |
| FREQ | | TRANSMIT POWER |
| RESERVED 1 | RESERVED 2 | MAX ATTEMPTS |
| | | TIME TO LIVE IN QUEUE |
| | | RESERVED 3 |
| | | RESERVED 4 |

| TIME STAMP | | |
|---|---|---|
| EVENT TYPE | RESULT TYPE | ERRORS IN PKT |
| SOURCE ADDR | FEC CODING | |
| DATA RATE | NEXT HOP ADDR | ATTEMPT NUM |
| RECEIVED SIGNAL STRENGTH | PACKET LENGTH | FREQUENCY |
| | TRANSMITTED POWER | |
| NOISE POWER | HEAD OF LINE TIME | |

FIG. 15

| RECEIVED SIGNAL STRENGTH | | |
|---|---|---|
| DATA RATE | MODE | |
| | FREQ | PRIORITY |
| | RESERVED 1 | RESERVED 2 |

ARCHITECTURE AND MECHANISM FOR FORWARDING LAYER INTERFACING FOR NETWORKS

BACKGROUND OF THE INVENTION

1. Field of the Invention

The present invention relates generally to an architecture, apparatus and method for communications in networks, such as ad-hoc networks. More particularly, the present invention relates to a mechanism and architecture through which multiple tables maintained by multiple routing managers can be efficiently handled by a single forwarding module.

2. Background and Related Art

Wireless ad-hoc networks preferably do not rely on base stations or other fixed infrastructure. Accordingly, ad-hoc networks are extremely important in military, emergency and temporary (e.g., business meetings, campaign headquarters, etc.) environments. As will be appreciated by those skilled in the art, in some ad-hoc networks, each node is responsible for routing "packets," or message signals, for other network nodes. An example of this type of network 100 is shown in FIG. 1a. As illustrated, node X can route packets between nodes W, Y and Z, for example. Nodes in an ad-hoc network preferably employ known routing protocols to accomplish their routing requirements.

For example, as discussed in U.S. Pat. No. 6,028,857, issued to R. Poor on Feb. 22, 2000, and assigned to the Massachusetts Institute of Technology, in a "link state" routing approach, each network node maintains a routing table that specifies an "optimal" path toward each network destination. In the U.S. Pat. No. 6,028,857 the term "optimal" is used to generally mean the shortest path, but may account for other factors such as load balancing.

As will be appreciated by those skilled in the art, a shortest-path calculation can be performed via a shortest-path first algorithm, for example, Dijkstra's algorithm as explained in Chapter 5 of "Routing in Communications Networks," M. Steenstrup, ed., 1995. As will also be understood by those skilled in the art, many other procedures exist for routing messages over a network, even when a configuration of the network may change. There are also many procedures for measuring or rating the connectivity of a network in a particular configuration (e.g., metric generation) that are well known in the art.

As discussed in the U.S. Pat. No. 6,028,857, when a node in a link state routing system transmits a message to a destination node, it first fetches from a routing table an entry for the specified destination. The routing table entry specifies which neighbor of an originating node should relay the message and the identification of that neighbor is installed in a message header as the recipient. The originating node then transmits the message. Many of the originating node's nearby neighbors receive the message, since radio frequency ("RF") transmissions are essentially omni-directional. However, of all the neighbors that receive the transmission, only the specified recipient acts on the message. The recipient relays the message in the same manner, according to an entry in its routing table corresponding to the destination node. This process continues until the message reaches the ultimate destination. The nodes in the U.S. Pat. No. 6,028,857, however, do not maintain these types of routing tables, but rather maintain "cost tables" that indicate the costs of transmission to other nodes in the network.

Other forms of ad-hoc wireless networks simplify routing and minimize routing traffic by organizing nodes (e.g., network members) into hierarchical groups called clusters, with each cluster having a cluster head. A cluster may include a single cluster head and zero or more cluster members. A cluster head represents affiliated cluster members to the network. Cluster head stations communicate with each other to form a network backbone, and cluster member stations relay messages to the network through affiliated cluster heads. In mobile systems, cluster members move into and out of clusters depending on their physical location and radio connectivity. An example of this type of mobile communications network 110 is shown in FIG. 1b, in which areas 1a, 1b and 1c represent individual clusters. In FIG. 1b, a double-circle indicates a Cluster Head ("CH"), whereas a single circle indicates a Cluster Member ("CM"). In the FIG. 1b example, CM2 and CM3 are affiliated with a cluster headed by CH1, and CM6 and CM7 are affiliated with a cluster headed by CH5. CH4 is the head of its own cluster, and does not have any currently affiliated cluster members.

Another example of a mobile communications network is disclosed in U.S. Pat. No. 5,850,592, issued to S. Ramanathan on Dec. 15, 1998, and assigned to the same assignee of this present application. The U.S. Pat. No. 5,850,592 discloses a method for a plurality of mobile stations to automatically organize them into a hierarchical network, in which some of the stations operate as message gateways for a cluster of mobile stations. Initially, mobile stations search for available cluster heads and initiate an affiliation procedure to establish them as cluster members. If the affiliation procedure is successful, a mobile station operates as a cluster member. Otherwise, a mobile station promotes itself to operate as a cluster head.

In the arrangement of the U.S. Pat. No. 5,850,592, each station operates in at least two basic modes. In the first mode, the mobile station serves as a message gateway for a cluster of other member stations. The second mode allows the mobile station to operate as a non-gateway (or "cluster member") station. Each mobile station determines which out of the two modes to operate in, as discussed above. The mobile stations disclosed in the U.S. Pat. No. 5,850,592 can operate at two different power levels. When there are no other available cluster heads, a mobile station operates as a cluster head, and transmits at a relatively high power level. A cluster head transmits at the relatively high power level to communicate with other cluster head stations and to typically provide longer distance network links. Although a cluster head communicates at a higher power level with other cluster heads, a cluster head can still communicate with its cluster members using a relatively lower power level.

One object of these types of ad-hoc networks is to route packets from an originating node to a destination node (or nodes). As will be appreciated by those skilled in the art, there are various operational modes or types of routing that can be used to accomplish this objective. For example, "broadcast" routing directs a packet to all network destinations simultaneously, whereas "multicast" routing directs a packet only to a well-defined group of nodes. "Unicast" (or point-to-point) routing directs a packet from an originating node to a single network destination.

Known system architectures typically employ a complexly interwoven routing manager (e.g., a software module) and forwarding layer to support either broadcast, multicast or unicast routing. These prior techniques typically create "stove-piped" solutions, meaning that a single forwarding layer is built for a single routing manager and a particular radio device. Porting this type of architecture to a new radio, or modifying the routing mechanisms, results in significant time, cost and complexity. With known system architectures, it is difficult, if not impossible, to support multiple routing schemes within a mobile radio station.

A radio frequency (RF) device that is typically a part of a wireless communications node generally has competing interests that produce performance trade-offs. Power, data rate, spread spectrum chipping code rate, and error correction methods are just a few examples of these different interrelated interests. As will be appreciated by those skilled in the art, often a selection of a value for one of these interests is not independent among the many interests present in a mobile radio and may have consequences for the network as a whole. For example, increasing the power for a particular transmission increases signal reliability, but may also drain a battery at a sending (or source) node and/or may cause more interference at other local network nodes. Accordingly, a problem exists in that a type-of-service (or a "quality or service") for a particular transmission must be balanced and integrated with a particular routing scheme and the radio parameters used for transmission (e.g., power, data rate, etc.).

These types of problems are not adequately addressed in the art. Thus, there is a need for a wireless packet router that seamlessly maintains multiple forwarding tables and radio parameters necessary to support quality of service guarantees. There is another need for an architecture that enables multiple routing mechanisms to co-exist with a single forwarding layer. There is also a need to handle quality of service mechanisms across different routing mechanisms in a packet radio router. There is a further need for a forwarding layer that allows extensive modification of radio parameters on a packet-by-packet basis, but does not require the forwarding layer to know the details of the particular radio layer. There is also a need for compact and efficient routing mechanisms and/or tables, and for a method for forwarding table decomposition.

SUMMARY OF THE INVENTION

According to the invention, a mobile communications station for use in a communications network is provided. The network includes a plurality of mobile communications stations, each station being configurable to route message packets for neighboring stations. The mobile communications station includes a transceiver to transmit and receive message packets.

According to one aspect of the present invention, the mobile communications station also includes an electronic memory circuit and an electronic processor circuit. The electronic memory circuit has network information stored thereon. The electronic processor circuit (i) determines a routing type for a message packet; (ii) selects a routing manager from one or more routing managers that corresponds to the determined routing type; (iii) selects at least one forwarding table corresponding to the selected routing manager; (iv) selects a radio profile for the message packet; and (v) causes the message packet to be transmitted according to information contained in the forwarding table and transmission profile.

In one embodiment, a mobile communications station that communicates among a plurality of mobile stations in a network is provided. The network has stations arranged in clusters of communication member stations, with one member station in each cluster being a head station for the cluster. Each member station communicates with the network through one or more cluster head stations. A cluster head station communicates with other cluster head stations. The mobile communications station includes an electronic memory circuit and an electronic processor circuit. The electronic memory circuit has network information stored thereon. The electronic processor circuit (i) selects a routing manager from among a plurality of routing managers based at least in part on a type-of-service indicator of a message packet to be transmitted; (ii) selects at least one network table from those maintained by the selected routing manager; (iii) determines a transmission profile; and (iv) causes the message packet to be transmitted according to information contained in the network table and transmission profile.

In another embodiment, computer executable code is stored on a computer readable medium. The code is to operate a communications router to route messages in a network. The network includes a plurality of routers, each router having a multi-layered system architecture including a forwarding layer and a plurality of routing modules. The plurality of routing modules each maintains at least one network table. The computer executable code includes code to: (i) direct the forwarding layer to select a class of routing modules from the plurality of routing modules based on an address indicator of a message; (ii) index into at least one network table maintained by the selected class of routing modules to obtain network information; (iii) select a radio profile for the message; (iv) direct the transmission of the message as specified by the network information and radio profile; and (v) provide an interface at least between the forwarding layer and the plurality of routing modules.

In still another embodiment, a method of operating a communications station in a communications system for communication among a plurality of member stations in a network is provided. The network has at least one of the member stations routing messages for neighboring stations. Each of the member stations has a multi-layered architecture including a forwarding layer. Through an interface, a plurality of operational routing managers have the ability to maintain information that is accessible to the forwarding layer. The method includes the steps of: (i) selecting a class of operational routing managers from the plurality of operational routing managers based on an address indicator of a message; (ii) selecting routing criteria for the message from information maintained by the selected class of operational routing managers; and (iii) transmitting the message based on the selected criteria.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

FIG. 5 is a diagram illustrating a format for a type-of-service field to unicast next-hop table look-up table.

FIG. 6 is a diagram illustrating a format for a unicast next-hop table.

FIG. 7 is a diagram illustrating a format for a neighbor table.

FIG. 8 is a diagram illustrating a format for a radio profile table.

FIG. 9b is a diagram illustrating the multicast forwarding table for a TOS entry according to FIG. 9a.

FIG. 10 is a diagram illustrating a format for a type-of-service field to broadcast radio profile index table.

FIG. 11 is a diagram illustrating a format for a type-of-service field to queuing discipline table.

FIG. 12 is a diagram illustrating a format for a radio profile.

FIG. 13 is a diagram illustrating a format for a link trace record.

FIG. 15 is a diagram illustrating a format for a received message information block.

DETAILED DESCRIPTION OF THE PREFERRED EMBODIMENTS

The present invention encompasses a mobile communications station and system architecture that is portable across various routing platforms, regardless of radio capability and routing protocols used. System compatibility can be enhanced with an application program interface ("API"), which includes standardized header files, calls, operations, etc. The term "API" may also be used generally to describe a standardized set of operations to handle or manipulate data. The present invention provides a "plug-and-play" like feature, in that multiple routing managers can be interchangeably used with a system architecture having a single forwarding layer. Accordingly, multiple route generation mechanisms can be concurrently employed in the system architecture with only a minimal amount of advance planning, such as setting configurations, and the like.

The preferred embodiments will now be described with respect to a wireless mobile communications station, station architecture and a network formed by a plurality of similar mobile stations. However, the present invention is not limited to the wireless mobile communications field. Instead, the invention is applicable to many other types of networks and communication nodes, including wireless metropolitan area networks, wireless local area networks, wireless personal area networks, military communications networks, specialized networks employed in extra-terrestrial applications, wired-networks having a variety of transmission capabilities trade-offs and a variety of types of service created by applications, and so forth.

Figure 1A:
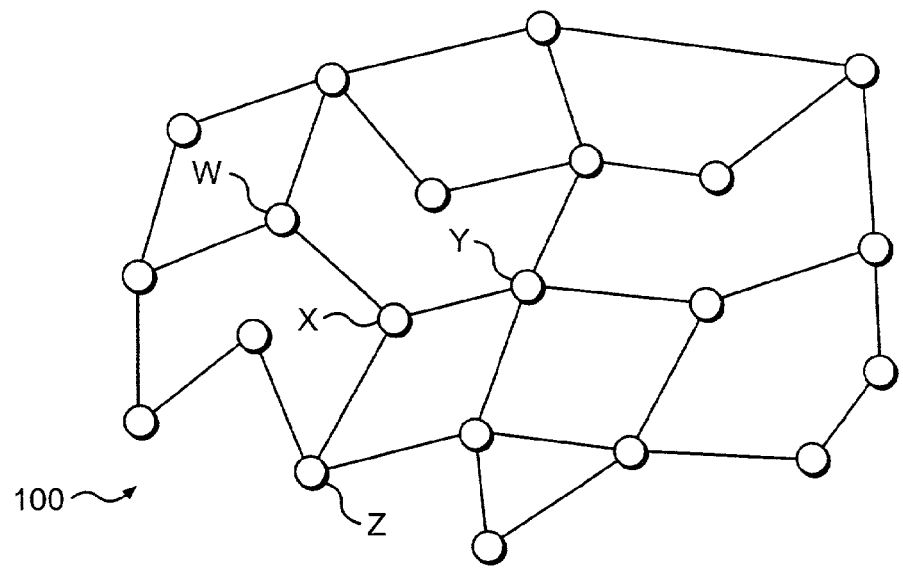
FIG. 1*a* is a diagram illustrating a network configuration.
Figure 1B:
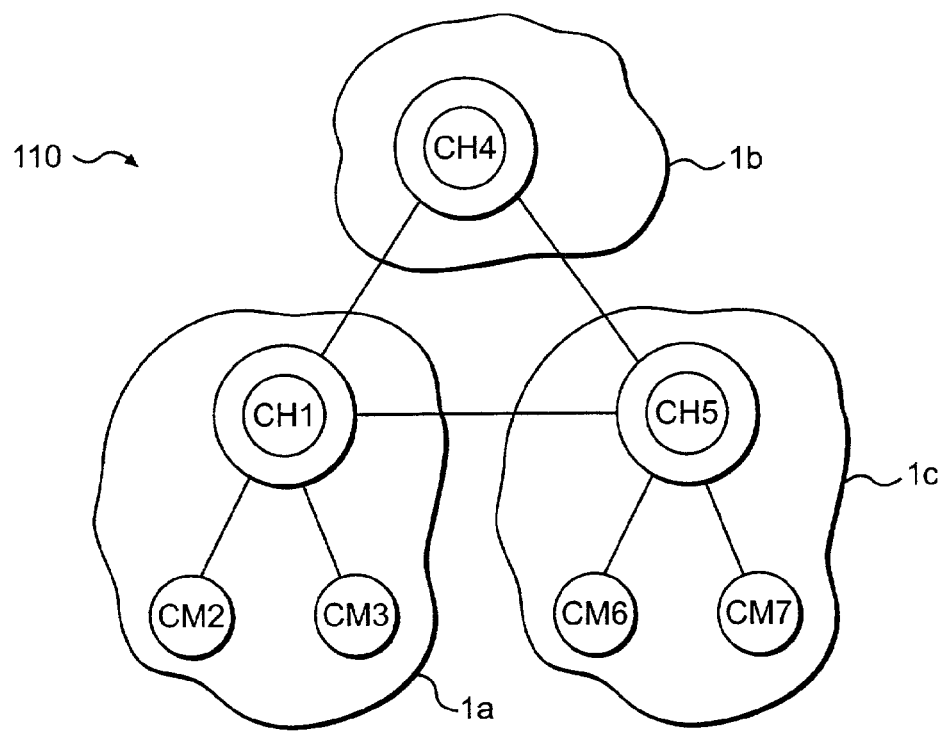
FIG. 1*b* is a diagram illustrating a network configuration having member stations arranged in cluster groups.
Figure 2:
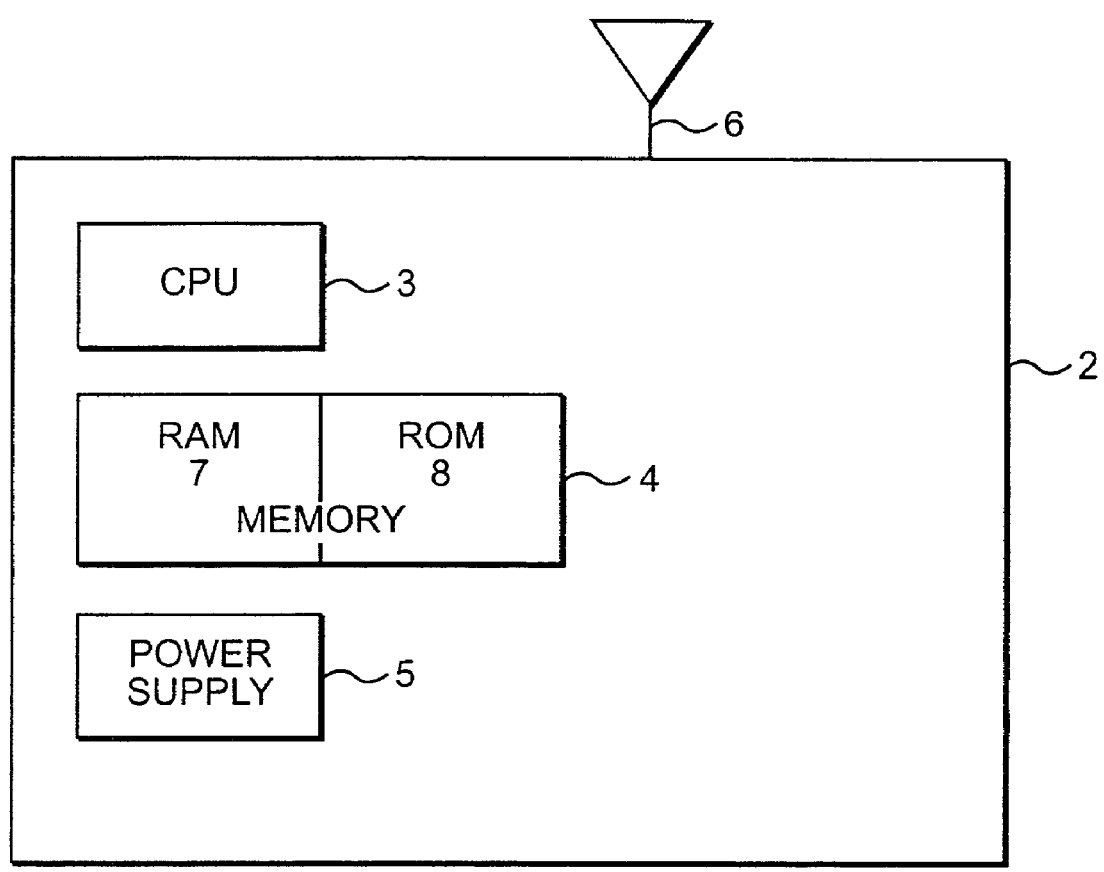
FIG. 2 is a block diagram of a mobile communications station.

A wireless mobile communications station 2 is shown in FIG. 2. The mobile station 2 includes at least one central processing unit (CPU or an electronic processor circuit) 3, a memory (or an electronic memory circuit) 4, a power supply 5, a transceiver 6 (e.g., a transmitter and a receiver), RAM 7 and ROM 8. The memory 4, RAM 7 and/or ROM 8 are each suitable for storing computer executable software, data structures and/or for storing various network tables. The transceiver 6 facilitates the transmission and reception of signals (e.g., RF signals, infrared, or so forth) in a known manner.

As will be appreciated by those skilled in the art, the CPU 3 executes computer executable software in a known manner. As such, the CPU 3 controls the operation of mobile station 2 and implements the methods, procedures and logic of the present invention. The mobile station 2 may include more than one transmitter and/or more than one receiver. Additionally, the mobile station can include known signal processing and measurement components. The mobile station 2 can also include an Ethernet interface, as well as other interfacing ports. With these arrangements, the mobile station 2 is able to communicate with mobile stations in the wireless network. The arrangement shown in FIG. 2 supports a modular decomposition as shown in FIG. 3a and a system architecture as shown in FIG. 3b.

Figure 3A:
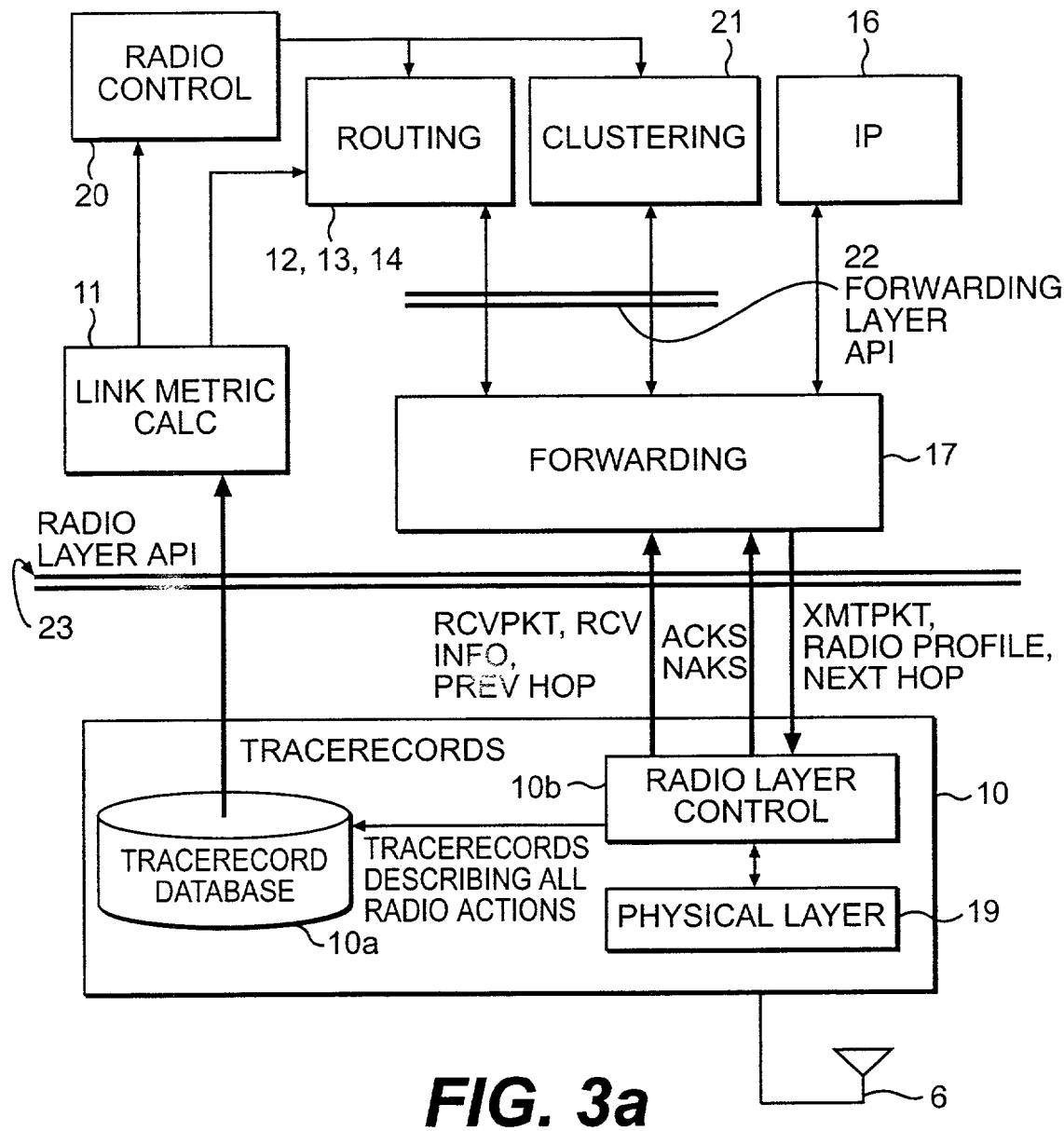
FIG. 3*a* is a block diagram illustrating one possible relationship between network protocols and a radio layer.

FIG. 3a depicts an example of a modular decomposition, including network protocols and a radio layer 10. As shown, a radio layer 10 may include components such as a trace record database 10a, radio layer control 10b, and/or may include (and/or may provide) access to a physical layer 19. The network protocols include multiple, interrelated software modules that share information on the state of the network. For example, system modules may include a link metric calculator 11, forwarding 17 layer and IP layer 16, a clustering module 21, a routing module (e.g., 12, 13, and/or 14) and a radio control module 20. In a mobile station, routing, neighbor discovery, island discovery and multicast routing management portions may depend upon information provided about the network through the transceiver 6. Generally, the majority of this information is filtered through the forwarding layer 17 or the link metric calculator 11. As will be appreciated by those skilled in the art, an API (e.g., a radio layer API) 23 can be used to provide a connection or interface between these components 11, 17 and the radio layer 10b, via standardized header files, calls, formats and so forth. This API 23 can also directly connect or interface routing modules to the radio layer 10b, where appropriate.

Preferably, in the FIG. 3a arrangement, forwarding layer 17 can send messages to the radio layer 10, and the radio layer 10 can send messages to the forwarding layer 17. For example, an unsigned 8-bit integer can represent each message type. When the forwarding layer 17 transmits a packet, it sends a standardized packet transmit (e.g., "XmitPkt") message to the radio layer 10. The forwarding layer 17 can also send messages related to transmission (or generally "radio") profiles (e.g., data representing radio, infrared, acoustical, optical, and/or electrical transmission properties and/or information) and next-hop information. The radio layer 10 can positively or negatively acknowledge a transmission of a packet by sending a message (e.g., "ACK" or "NAK") to the forwarding layer 17. Similarly, the radio layer can send a packet-received message (e.g., "RcvPkt") to the forwarding layer 17. A packet-received message can also include previous-hop information and/or other information regarding the received packet. Other messages may include radio resets, other status or error indications, and so forth.

Figure 3B:
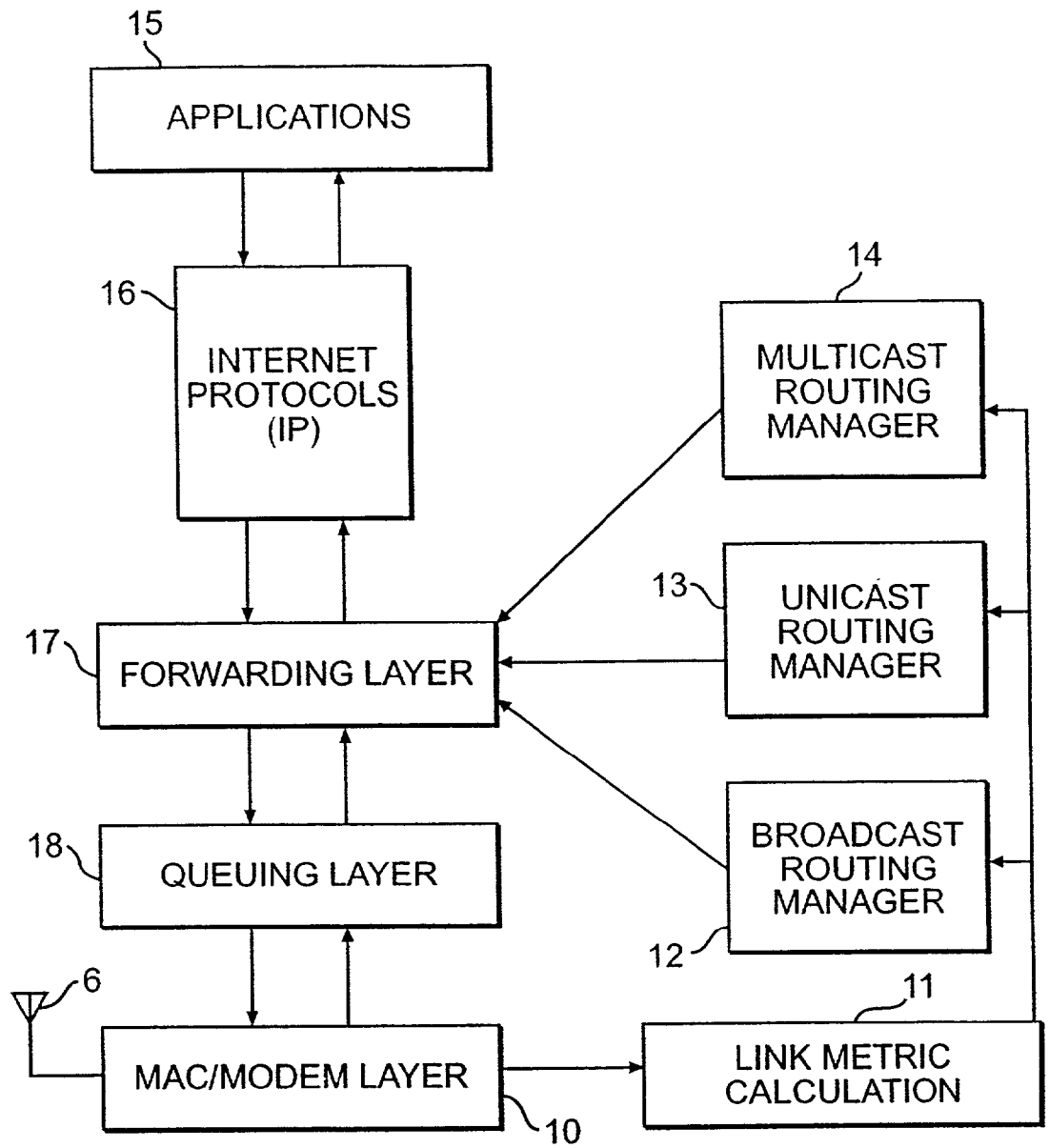
FIG. 3*b* is a block diagram illustrating an example of a system architecture according to the present invention.

A preferred system architecture for the mobile communication station 2 is shown in FIG. 3b. As will be appreciated by those skilled in the art, the illustrated architecture is multi-layered, with each layer (e.g., a software module) communicating with the layer above and/or below it. A radio layer 10 (e.g., a MAC/Modem Layer) sends and receives packets via the transceiver 6, and preferably keeps detailed statistics on parameters of the transmissions. For example, the radio layer 10 preferably maintains a set of link "trace records" to record information regarding transmissions over a communications channel(s) (e.g., an RF channel). Such information may include transmission attempts, received signal strength, packet receptions, time-of-arrival ("TOA") receptions, promiscuous request-to-send ("RTS") and clear-to-send ("CTS") receptions, as well as other information based on radio capabilities. The preferable implementation of a communications node treats trace records as "opaque" data from the perspective of networking layer software code. For example, the link metric calculator retrieves records and accesses parts of the trace records, by using standardized calls that use a predefined common set of names, but internally use specially written code for particular trace records. In this way, a radio driver can provide specific capabilities (e.g., radio characteristics, parameters, etc.) in trace records and the network layer software code does not have to be modified for every different radio.

The radio layer 10 preferably associates a sequence number (e.g., an unsigned 32-bit integer) with each trace record so an application or other software module can determine if any new information has been recorded by simply reading the latest sequence number. An "array" of link trace records can be maintained to reflect transmission history and network activity. Applications or other software modules can call or access this array, or a subset of the array, using standardized API calls.

An example of a trace record format is shown in FIG. 13. As shown, the format includes a time stamp (e.g., a 32-bit integer) of a packet, an event type (e.g., an 8-bit integer) such as a packet transmission or reception, result type (e.g., an 8-bit integer), forward error correction coding ("FEC-coding"; e.g., an 8-bit integer), an error indicator for a packet (e.g., an 8-bit integer), a source (e.g., a 16-bit integer) and next-hop address (e.g., a 16-bit integer), data rate of a transmission (e.g., a 16-bit integer), a packet length (e.g., an 8-bit integer), a number of transmission attempts (e.g., an 8-bit integer), a received signal strength indicator (e.g., a 16-bit integer), a power level for a transmitted packet (e.g., an 8-bit integer), signal frequency (e.g., an 8-bit integer), signal noise power (e.g., a 16-bit integer in dBm), queuing time and/or head-of-line time (e.g., a 16-bit integer in ms). The head-of-line time represents an amount of time a packet spends at a head of a queue, which may indicate a delay across a link. As will be appreciated, other radio profile formats including different parameters and/or bit integer lengths, could alternatively be used based on radio characteristics, for example. In an alternative implementation, the radio layer 10 provides the link trace records (or data from which such records can be created) to the forwarding layer 17, and the forwarding layer 17 makes the link trace records available to applications or other modules.

To facilitate compatibility with a wide variety of processor platforms, a trace record length is preferably a multiple of 8 bytes. In this regard, each record field is identified with a preferable length, e.g., an unsigned 32-bit or 16-bit integer field. However, as will be readily understood by one of ordinary skill in the art, these specified lengths are provided as examples and are not intended to limit the present invention.

With reference to FIG. 3b, a link metric calculator 11 is an application (or software module) that periodically "harvests" data contained in the trace records via a call provided by the API. The link metric calculator preferably summarizes data so as to maintain an understanding of the physical parameters of network communications, instead of just maintaining arbitrary relative values. For example, energy is preferably expressed in terms of decibels in relation to milliwatts, and not merely as an arbitrary numerical unit. Of course, the inventive features as disclosed in this application are applicable even if the link metric calculator 11 employs arbitrary relative values.

The summarized data is preferably exported from the metric calculator 11 to each of the managers that generate routes (multicast 14, unicast 13, broadcast 12, virtual circuits, etc.). The routing managers use the data to update tables and radio parameters. For example, a routing manager (via the link metric calculator 11) may determine that a radio transmission in a particular network arrangement requires a minimum power level of 10 dBm. The routing manager could then update corresponding radio parameters to reflect this requirement.

Each of the routing managers (or routing "generators") 12, 13, 14 creates and/or maintains a set of tables for the type of traffic they support. Each of the tables contains zero or more entries. The tables are formatted in a standardized form so as to be compatible with a single forwarding layer 17 through the standardized API 22 (e.g., a forwarding layer API), regardless of which routing manager generates the table. As will be appreciated by those skilled in the art, the API 22 provides standardized calls and operations to allow any local control module, e.g. 12, 13, 14, or 21, to access (e.g., "set" or "get" operations) these tables. The forwarding layer 17 has the ability to index into or parse these tables.

Routing tables are initially populated according to known techniques. For example, when a mobile station is introduced to an existing network, it gathers "beacons" or other transmissions emitted by nearby stations. These beacons establish which neighbors are nearby and/or may provide information regarding the overall network configuration. Network stations may also periodically transmit network "updates," which contain network information (e.g., network configuration and metric data). The mobile station can build and update tables using this type of network information and using, for example, routing algorithms such as Dijkstra's algorithm. The routing managers 12, 13, 14 are preferably responsible for selecting an appropriate subset of this information, formatting this subset to be compatible with the forwarding layer 17, and making this subset available to the forwarding layer 17 via the forwarding layer API 22.

Generally, when packets are generated at an application layer 15 and are passed down through an IP stack 16 they are delivered to the forwarding layer 17 with a final destination address (or indicator). The forwarding layer 17 selects a corresponding routing manager (e.g., broadcast 12, unicast 13, multicast 14, etc.) based on the destination address, e.g., a broadcast, unicast or multicast address.

Each routing manager manages one or more tables that are compatible with the forwarding layer 17. The forwarding layer 17 uses multiple tables acquired from a selected routing manager based on characteristics such as a type-of-service ("TOS") of a packet to ultimately generate routing information, control information (e.g., a radio profile) for the radio layer, and an indication of a correct queuing discipline to use with the packet. Typically, a TOS indicator is assigned to a packet by an application to specify particular service parameters. As will be appreciated by those skilled in the art, TOS relates to service parameters required by a packet. Service parameters may include transmission power requirements, priority indicators (e.g., "urgent" or "low delay"), error ratios, resilience, transit delay, and so forth. The packet is preferably sent to a queuing layer 18 that manages an interaction with the typically much slower radio layer 10 according to a selected queuing discipline. The queuing layer 18 passes the packet with routing details and radio control information to the radio layer 10 for transmission through the transceiver 6.

The present invention provides a mechanism and an architecture through which multiple tables maintained by multiple routing managers, e.g. 12, 13, and 14, can be efficiently handled in a forwarding module. Specific examples of the operational aspects of the forwarding module 17 and the information received from routing managers for three types of traffic, e.g., unicast, multicast and broadcast, will now be described.

With respect to a unicast message, a unicast node number is preferably represented as a 16-bit unsigned integer in the range 1 to 65534 decimal. For unicast messages that are eligible to be forwarded via multiple hops, as discussed below, such an address is preferably carried along with the message to identify the final destination. For multicast messages and forwardable unicast messages, another such address is carried along with the message to identify the originating node. Node numbers may also be used to identify the next-hop for all unicast messages, and for (non-broadcast) next-hops for multicast messages.

With respect to broadcast messages, a broadcast address is preferably represented as a 16-bit unsigned integer with all bits set to 1, e.g., 65535 decimal or FFFF hex.

With respect to multicast messages, a multicast group identifier, which is preferably represented as an unsigned 32-bit integer, has all valid values except for zero.

In order to forward a message destined to a multicast group, our inventive system preferably generates a list of next-hop node numbers and/or the broadcast address. A copy of the message is sent to all next-hops (which may include the local node). The multicast group identifier is preferably carried along with the message to identify the multicast group to which the message is addressed.

Messages being sent via our system will typically originate from one of three sources. The first source is a local control module, such as routing 12, 13, 14 or clustering 21. The second source is an IP layer 16 on a local node. The third source is a network node, which may forward messages.

A message is preferably processed differently depending on the message source. The message type is also identified based on the method by which the message is received. For example, when the inventive system is implemented in a new environment, for example running under a new operating system, one task to be accomplished is to implement a means for local control modules 12, 13, 14, 21 to send messages to forwarding layer 17 (and to receive messages from the forwarding layer 17). If a message arrives by this means, then it can be readily identified as having originated from a local control module.

Also, when the inventive system is implemented in a new environment, another task to be accomplished is to "plumb into" the IP layer 16 implementation. Typically, this means that the forwarding layer 17 is arranged to appear to the IP layer 16 either as a virtual network interface or as an intermediate (or "shim") layer. In either case, if a message arrives via the IP plumbing mechanism that is established, then it can be readily identified as having originated from the IP layer 16.

Furthermore, if a message arrives from a wireless (or wired) network interface 10 that is used for communication with other nodes, then that message is readily identified as having been forwarded by another node.

Various processing methods are now discussed. For example, processing messages from local control modules such as routing 12, 13, 14 or clustering 21 will be discussed.

In one implementation, control modules communicate only with directly reachable neighbors. Also, these modules send unicast and broadcast messages only; they do not send multicast messages. Of course, these constraints are not fundamental to the operation of our present invention. For example, another implementation may include a network-wide flooding mechanism at the forwarding layer 17, for the convenience of implementers of control modules. Also, another implementation allows control modules to make use of multicast group identifiers when addressing messages.

In the implementation in which control modules communicate only with directly reachable neighbors, a forwarding layer 17 can skip a normal next-hop lookup operation when processing messages from local control modules. Hence, when a control module generates a message and hands it to the forwarding layer 17, as discussed above, the control module preferably specifies: i) the unicast or broadcast next-hop address (e.g., when this next-hop is effectively the final destination for this message); ii) the TOS (type-of-service) for this message; and iii) the identifier of the Radio Profile to be used when transmitting this message.

A radio profile identifier may be used to index into a radio profile table (not shown) that is designated for messages from local control modules. The resulting radio profile is preferably supplied to the radio layer 10, along with the message. The radio profile may be opaque. The type-of-service may be used to index into a type-of-service to queue discipline table (e.g., as in FIG. 11), which results in information that may be handed to the queuing layer 18, or alternatively used by the forwarding layer 17 or radio layer 10. This is analogous to a final processing of forwardable unicast messages, as described below.

Messages from the IP layer 16 of a local node (e.g., a mobile station) will now be discussed. In particular, two approaches will be discussed. In the first approach, IP datagrams are received from the IP layer 16, and a "destination IP address" is examined. The destination IP address is preferably an unsigned 32-bit integer.

For a unicast IP address, the network of nodes that the inventive system interconnects is preferably identified by a unique IP prefix. This prefix preferably occupies some number of the most significant bits of the IP address for each node. In planning the network, the least significant bits of a node's address is arranged to contain the node's "node number." The number of bits will depend on the number of nodes that are being interconnected. For example, three bits allows addressing nodes 1 through 7. When an IP datagram is received with a unicast destination IP address, the appropriate number of least significant bits of the IP address is copied into the least significant bits of a pre-zeroed 16-bit unsigned integer, and that integer is used as the destination node number.

For a broadcast IP address, the IP layer 16 is used in an implementation-specific manner to identify whether the destination IP address should be treated as a broadcast IP address. If so, then the corresponding destination address is a 16-bit integer containing all ones, e.g., FFFF hex.

Multicast IP addresses are preferably identified by a unique code in the four most significant bits of the address. The remaining bits specify the multicast group. When an IP datagram with a multicast destination IP address is received, the appropriate number of least significant bits of the IP address is copied into the least significant bits of a pre-zeroed 32-bit unsigned integer, for example, and that integer is used as the multicast group identifier.

In the second approach, the forwarding layer 17 is attached to the IP layer 16 as if the forwarding layer 17 were an Ethernet-class interface, and an ARP (Address Resolution Protocol) mechanism is allowed to function. For typical Ethernet LANs, the ARP mechanism is used to translate from a 32-bit IP address to a 48-bit IEEE MAC address. This is typically accomplished by broadcasting an ARP request on the LAN for the desired IP address; the resulting ARP response will preferably contain the corresponding 48-bit IEEE MAC address.

This mapping may be cached by the local node in an ARP cache, and used when sending subsequent IP datagrams via the Ethernet LAN. It is also typically possible to manually add static entries to the local ARP cache.

The ARP translation mechanism is preferably employed as follows. As mentioned previously, each node that our inventive system interconnects is assigned an IP address, and these addresses share a unique IP prefix. An Ethernet-class interface that the forwarding layer 17 presents to the IP layer 16 registers for this unique IP prefix. For each of the IP addresses, a corresponding 48-bit "pseudo" MAC address is constructed in which we embed that node's 16-bit unicast node number. In one embodiment, the embedding is accomplished by placing the 16-bit node number in the two least significant bytes of the 48-bit pseudo MAC address. Of course, other means of embedding are possible, e.g., by using two bytes other than the pair of least significant bytes.

The ARP mechanism then returns the correct pseudo MAC address when presented with each node's IP address. Two different methods, to interface the forwarding layer 17 to different IP layer 16 implementations, are as follows. First, static entries that contain the correct IP address to pseudo MAC address mappings can be added to the local ARP cache of each node. Second, the ARP requests can be intercepted as they are handed to forwarding layer 17, which can locally generate ARP replies containing the correct mappings. Receipt of these replies will preferably cause the local node to store the mappings in its ARP cache. Of course, both the first and second approaches can be used to populate an ARP cache.

Since the forwarding layer 17 attaches to the IP layer 16 as if the forwarding layer 17 were an Ethernet-class interface, the IP layer 16 implementation preferably arranges for the destination IP address to be run through the ARP translation process before a datagram is presented to the forwarding layer 17 for transmission. Hence, the forwarding layer 17 is presented with a 48-bit destination MAC address, which is processed as follows.

For a unicast MAC address, the embedded unicast destination node number is extracted from the 48-bit pseudo MAC address. In one implementation of our inventive system, this means that the 16 least significant bits of the unicast MAC address are copied into an unsigned 16-bit integer.

For broadcast MAC addresses, if a broadcast MAC address is received (which can be identified because all 48 bits are set to 1), then the system's corresponding broadcast address is an unsigned 16-bit integer containing all ones, e.g., FFFF hex.

For multicast MAC addresses, if the ARP mechanism is presented with a multicast IP address, it constructs a special 48-bit multicast MAC address. The three most significant bytes preferably contain a unique code, and the least significant 23 bits will contain the multicast group number that was present in the least significant bits of the multicast IP address. When a MAC address that contains the special multicast code in the upper three bytes is received into the inventive system, the appropriate number of least significant bits (e.g., 23 bits in one embodiment) of the MAC address are copied into the least significant bits of a pre-zeroed 32-bit unsigned integer, and that integer is used as the multicast group identifier.

The second approach increases the portability of our design across environments, given that some IP layers such as the one supplied with the Windows 98 operating system may only permit our system to intercept IP datagrams after the ARP translation has already occurred. Also, all IP layer implementations that we have yet encountered allow attachment post-ARP. By choosing the second approach, which works in the greatest number of environments, portability of our design is thus maximized. Also, the second approach allows for greater flexibility in the mapping from IP address to node number, since a pseudo MAC address is employed as an intermediate step, and any node number can be embedded in this MAC address. In contrast, with the first approach, the node number is directly embedded in the low order bits of the node's IP address. Still, either approach may be used with the present invention.

The processing of messages arriving from the wireless (or wired) network interface 10 that is used for communication with other nodes will now be discussed. Essentially, the sending node has completed all of the address translation work in this case, and attached a header to the message that contains the information necessary to make a forwarding decision. The message will have been marked as forwardable or non-forwardable. If forwardable: i) the header will identify the unicast node number of the originating node; ii) if unicast, the header will identify the unicast node number of the destination to which the message is addressed; iii) if broadcast, and the implementation supports forwarding of broadcast messages, the header will specify the special broadcast address (FFFF hex) as the destination to which the message is addressed; and iv) if multicast, the header will identify the multicast group to which the message is addressed. In an alternative implementation, the addressing information could be carried in a message trailer, rather than in a header.

When a packet arrives from either the IP layer 16 (e.g., a packet generated by an application) or the radio layer 10 (e.g., a packet received from the network) or a local control module 12, 13, 14, 21, the packet's address type (or address indicator) is evaluated, as discussed. We will first discuss the processing of packets that have a unicast destination address indicator. Generally, if a packet has a unicast address, and the address matches an address of the node itself, the packet will be sent up through the IP layer 16 for evaluation by an application. If a packet has a unicast address but is not intended for that node, the forwarding module 17 processes the packet.

Generally, the forwarding layer 17 consults a set of tables maintained by the unicast routing managers 13 to determine an appropriate next-hop and a radio profile structure. The forwarding layer 17 then preferably constructs a message that contains information including a message type identifier, a next-hop address, a pointer to a packet buffer to be sent, the length of the packet buffer (e.g., in bytes), a radio profile structure specifying transmission parameters for the packet and a length of the radio profile. The forwarding layer 17 then may prompt the queuing layer 18 to enqueue the message for the radio layer 10.

This process will now be described in even greater detail with reference to FIG. 4. The forwarding layer 17 determines a type-of-service ("TOS") indicator (e.g., a packet field having a predetermined bit length) of a packet when it receives a unicast packet. Having identified the TOS indicator, the forwarding layer 17 consults a TOS to unicast forwarding table lookup table ("unicast TOS table") that is associated with the unicast routing managers 13. This process is shown in step S1 of FIG. 4. A unicast TOS table maps the TOS indicator of the packet to a specific unicast forwarding table index number that is associated with the specified type-of-service requirements. FIG. 5 is an example of a unicast TOS table format, where "i" and "j" represent different tables.

The various unicast routing managers 13 perform standardized operations provided through the forwarding layer API 22 to "set" and to "get" the unicast TOS table. For set operations, a "subset" of table elements for the unicast TOS table can be set in order to support multiple unicast routing managers that each may manage a subset of the TOS space. During a set operation, the unicast TOS table is preferably specified as a variable length array of two-byte structures.

The first element of each structure preferably specifies a TOS field value (e.g., as an unsigned 8-bit integer), and the second element preferably specifies the corresponding unicast forwarding table number (e.g., as an unsigned 8-bit integer). On a get operation, however, the TOS field is preferably not part of the table. On a get operation, the unicast TOS table is preferably specified as a 256-byte array of unicast forwarding table numbers, where the first byte of the array is the forwarding table number to be used when forwarding packets with a TOS field value of 0. The last byte of the array is the forwarding table number to be used when forwarding packets with a TOS field value of 255. The TOS-related tables preferably start with a value of zero ("0"), while other tables generally start with an index value 1. A forwarding table number of zero preferably indicates that there is no unicast forwarding table associated with the corresponding TOS value, and unicast traffic carrying this TOS value (and addressed other than to the local node) should be dropped. In the simplest case of a single unicast forwarding table, e.g., table number 1, all 256 entries in the unicast TOS table would be set to the value 1. In another example, all 256 entries in the unicast TOS table are set to a different value, and in yet another example, the 256 entries in the unicast TOS table are set to a variety of different values.

The forwarding layer 17 uses the TOS field to index into the unicast TOS table, and thereby determines which unicast forwarding table "t" should be used for the TOS associated with the packet. In this example a unique table index "t" identifies an appropriate forwarding table. "Appropriate" in this context means a selection will at least satisfy a packet's type-of-service requirements, when possible. A particular TOS can be pre-selected to correspond with a particular forwarding table. In some cases, an application may also assist with TOS determinations, since there are standard type-of-services associated with IP protocols. Preferably, one or more unicast forwarding tables are associated with a particular unicast routing manager. Each forwarding table preferably includes a unicast next-hop table (e.g., a next-neighbor table), a neighbor table, and a radio profile table.

After identifying a particular unicast forwarding table "t," the forwarding layer 17 preferably identifies a destination address (e.g., a node number or other address identifier) for the packet. In the preferred embodiment, the destination address is represented as an unsigned 16-bit integer. The forwarding layer 17 uses the destination address to index into the unicast next-hop table associated with forwarding table t to retrieve a neighbor table index number (preferably represented by an unsigned 8-bit integer), e.g., "i", as shown in step S2 of FIG. 4. An example of a unicast next-hop table format is shown in FIG. 6. A next-hop is identified by indexing into an associated neighbor table for the forwarding table t, as shown in step S3 of FIG. 4. In this regard, rather than each entry in a next-hop table specifying the next-hop node number and related information as is found in conventional forwarding tables, an entry in the unicast next-hop table preferably specifies an index into an associated, fairly compact, neighbor table. The neighbor table, as discussed below, preferably specifies a next-hop node address (e.g., a node number) and related information for each neighbor.

There are many advantages to providing compact and efficient tables. A set of tables is made compact by preferably representing (or entering) each information element only once. An information element can then be referenced multiple times, for example by specifying a table index. For example, the details regarding a neighboring node appear in a neighbor table entry, and these details are referenced by a neighbor number (or index) by a plurality of entries in an associated next-hop table. The tables disclosed in this application are also efficiently accessed. For example, the tables are preferably designed to allow direct indexing whenever possible. When direct indexing is impossible or highly impractical (e.g., when looking up information corresponding to a 32-bit multicast group identifier), tables are preferably accessed via techniques such as hashing, rather than by performing a linear scan. In a preferred embodiment of the present invention, the processing of a message by the forwarding layer 17 involves several quick lookups, performed serially, into different tables.

The tables disclosed in this application are also preferably efficiently updated. For example, tables are compact (as discussed above), and hence can be transferred, moved, or copied quickly. Also, information is preferably not stored redundantly, so it is not necessary to update the same information in multiple table entries. Decomposing the forwarding information base into a set of compact and efficient tables results in a design that can be fairly simple, yet is extensible and modifiable. For example, new table types can be added as needed, or the format of an existing table can be modified (though it may be advantageous instead to create a new version of the table, and have the forwarding layer API 22 support both versions). In contrast, with a traditional single, monolithic forwarding table, any change to the table's structure has a global impact on the system, for example affecting a forwarding layer and the plurality of managers that control that forwarding layer.

Another advantage of the present invention is that the table design, particularly the unicast and multicast TOS tables, allows a plurality of routing managers of a given class (e.g., unicast or multicast) to operate simultaneously without interfering with each other. In such a case, each manager can support a subset of all possible types-of-service.

Rather than explicitly specifying radio characteristics along with each message, radio profiles are preferably pre-computed and stored in a radio profile table that is associated with a specific next-hop table and neighbor table. The next-hop table is preferably a complete table (e.g., contains no holes). In this regard, if a route does not exist to a particular destination, a "0" value will be used for the neighbor table index. The forwarding layer 17 will drop the packet if a "0" value is returned. From a design perspective, the destination node number (or other destination indicator) is preferably not part of the unicast next-hop table. The unicast next-hop table is preferably specified as a variable length array of unsigned bytes. The first byte contains the neighbor table t index i for a destination network node number 1, and the last byte contains the neighbor table t index j for the maximum destination network node number.

After the forwarding layer 17 identifies a neighbor table index value, the neighbor table associated with forwarding table t is indexed by the neighbor index value. In this preferred manner, the forwarding layer 17 determines an actual address of the next-hop, a radio profile index number, and optionally, determines additional fields for transmission of the packet. This step is shown in step S4 of FIG. 4. A radio profile index entry in the neighbor table can either specify an index into the radio profile table or express a zero ("0") value if an explicit profile has not been specified. An example of a neighbor table format is shown in FIG. 7. From a design perspective, the source node number is preferably not part of the neighbor table. The neighbor table is preferably specified as a variable length array of 4-byte structures, so that the first structure in the array identifies neighbor data associated with neighbor table t index i. Each structure preferably contains a next-hop node number (e.g., a 16-bit integer field in host byte order), a radio profile index (e.g., an 8-bit integer field), and an optional flags field (e.g., an 8-bit integer field), as discussed.

The neighbor table translates between the virtual neighbor index obtained from the next-hop table and the neighbor's actual node number that is used by the radio layer 10. A separate neighbor table is specified for each forwarding table. Since "0" refers to a "no route" situation in the next-hop table, the index into the neighbor table preferably begins at 1. Preferably, each entry line (or structure) in a neighbor table contains an index for a radio profile that corresponds to the selected neighbor when using a particular forwarding table. A radio profile index of "0" indicates that the forwarding layer 17 should make its own decision about the radio profile or, alternatively, indicates that the packet should be sent to the radio layer 10 with no profile. The optional flags field can be provided for additional transmission or processing instructions and/or to satisfy compatibility requirements with existing forwarding tables.

Figure 4:
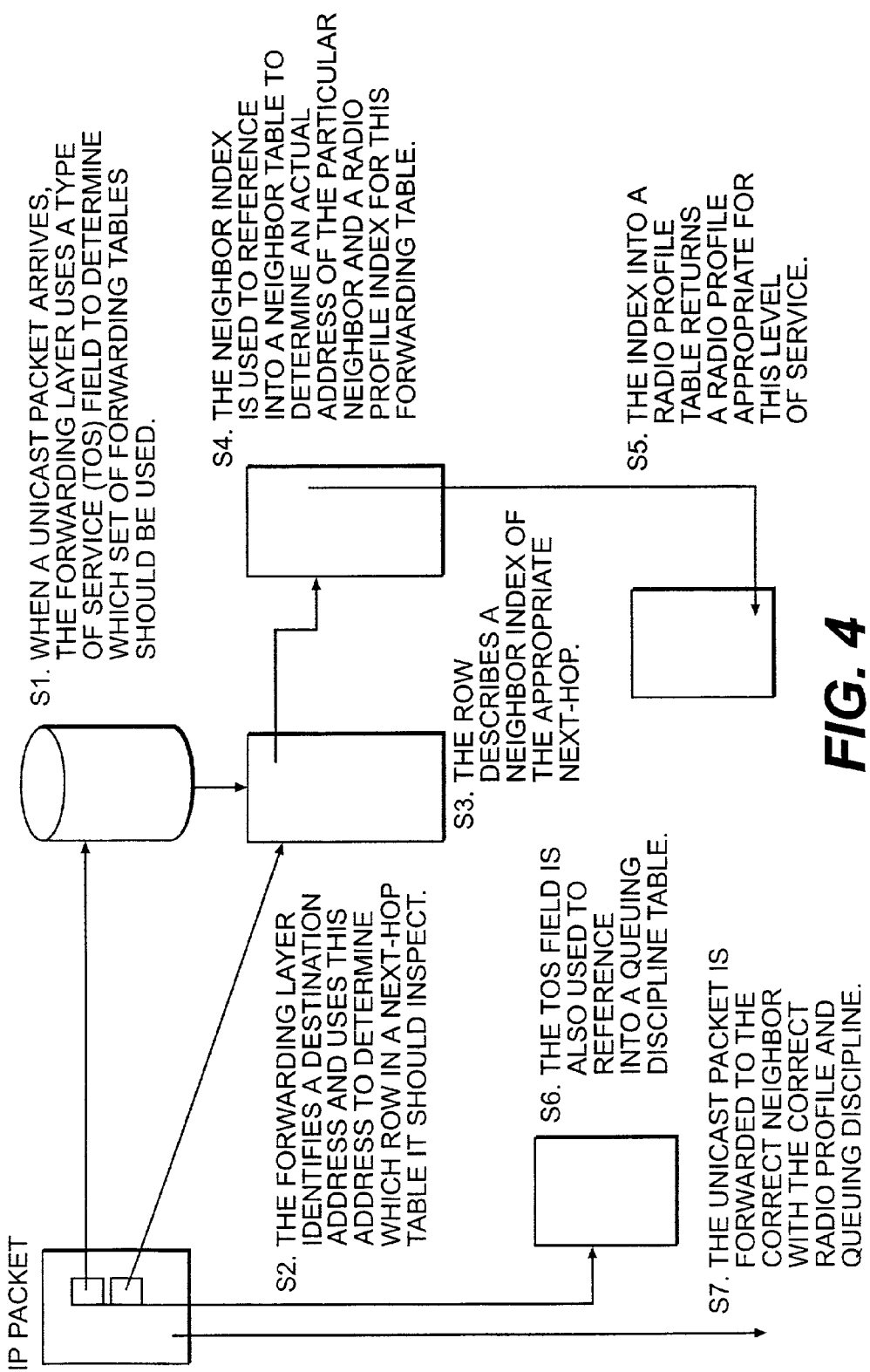
FIG. 4 is a diagram illustrating an operational aspect of the present invention with respect to unicast routing.

The forwarding layer 17 then indexes into a radio profile table associated with the current unicast forwarding table t to retrieve a set of parameters used for transmitting the packet to the selected neighbor, as shown in step S5 of FIG. 4. An example of a radio profile table format is shown in FIG. 8. A radio profile describes parameters that are to be passed to the radio layer 10 for transmission. Preferably, a different radio profile table is associated with each forwarding table t.

An example of a radio profile format is shown in FIG. 12. As shown, a profile may include parameters related to initialization (e.g., 16-bit integer data), transmission power (e.g., 8-bit integer data), operation mode (e.g., 16-bit integer data), data rate (e.g., 16-bit integer data), a maximum number of transmission attempts (e.g., 8-bit integer data), packet priority (e.g., 8-bit integer data), frequency (e.g., 8-bit integer data), FEC coding (e.g., 8-bit integer data), and time to remain "alive" in a queue (e.g., 8-bit integer data). The profile may also contain "reserve" fields for future expansion capabilities or to accommodate architecture dependent parameters. As with the other tables, the example bit length of the data may be varied without deviating from the scope of the present invention. Also, as will be appreciated by those skilled in the art, the radio profile illustrated in FIG. 12 is not limited by the specific listed parameters, and may contain other parameters, or even a sub-set of the listed parameters.

A radio profile is preferably a predetermined array of bytes. Radio profiles may contain differing information, but are similarly formatted. Preferably, a radio profile is created, and thereafter manipulated, by routing managers, layers or applications via standardized calls and operations, e.g. via an API. In this regard, the radio layer 10 can consistently extract information from a standard radio profile. A radio profile may also be an "opaque" array that the forwarding layer 17 can blindly attach to the packet before sending it to the radio layer 10. In this case, the forwarding layer 17 would have no understanding of the inner structure of an opaque radio profile, except for its size. One advantage of an opaque radio profile is that it may be possible to change the inner structure of the profile without requiring recompilation of a routing manager or system software code. Another advantage is that layers, applications, and routing managers may be written or constructed to accommodate a radio profile (and to manipulate the profile where appropriate via standardized calls and operations), irrespective of the inner structure (e.g., format) of the radio profile itself.

For some implementations, however, it may be necessary for the forwarding layer 17 to have some level of knowledge of the contents of the radio profile array so that it can interface with the radio layer 10 in a radio-specific way. For example, with a "simple" radio, the forwarding layer 17 may have to feed or translate radio parameters in a specific manner. Accordingly, the forwarding layer 17 may access parameters contained in a radio profile when needed via standardized calls and operations.

The forwarding layer constructs a message to be sent to the radio layer 10. The message contains the selected next-hop address and radio profile, along with packet information or packet location data. Typically, some queuing is provided for messages as they are passed from the forwarding layer 17 to the radio layer 10. As shown in step S6 of FIG. 4, the forwarding layer 17 can use the packet's TOS field to determine a method of queuing the packet by consulting a universal TOS to queuing discipline table ("queuing table"), as illustrated in FIG. 11. This queuing table maps the TOS field of a packet to a queuing discipline that should be used, e.g., by a queuing layer 18, according to the required service parameters. For example, a queuing discipline may specify a First-In-First-Out, First-In-Last-Out, Random-Early-Drop, class-based queuing and other priority-based queuing discipline. As will be appreciated by those skilled in the art, the significance of the queuing discipline is dependent on the capabilities of the forwarding layer 17 and a particular operating protocol (e.g., an operating system) that the mobile station 2 is running. In some environments, it may not be necessary to perform Step S6 of FIG. 4, for example, because the environment provides an alternative means to determine a queuing discipline.

An example of a queuing table format is shown in FIG. 11. From a design perspective, the TOS field is preferably not part of the queuing table and the queuing table is represented as an array of 256 16-bit queuing discipline descriptors. The first 16-bit descriptor in the array identifies the queuing discipline to be used when forwarding packets with a TOS field value of 0 (e.g., an 8-bit integer). The last 16-bit descriptor in the array is the queuing discipline to be used when forwarding packets with a TOS field value of 255. As with the table shown in FIG. 5, the queuing table starts with the value 0. The system architecture may also be designed so that the forwarding layer 17 or the radio layer 10 alternatively performs queuing functions, rather than a queuing layer.

As shown in step S7 of FIG. 4, a message is forwarded through the radio layer 10 for packet transmission to the correct neighbor, with the corresponding next-hop neighbor address and correct radio profile, under the selected queuing discipline.

We will now discuss the processing of packets that are addressed to a multicast group. There are various methods for distributing multicast packets across a network, including "source-based trees" and "core-based trees." In source-based trees, a spanning tree is generally calculated from each node in the network that is a potential source of multicast packets. This calculation may be done independently for each distinct set of types-of-service. When a multicast packet arrives at a node, the origin node number (e.g., the number identifying the node at which the packet originated) is used to select the appropriate spanning tree, which is identified by a multicast next-hop table number. This tree potentially identifies all down-stream neighbors to whom the packet needs to be forwarded, in order to "span" the network. However, a given multicast group may not have members at all down-stream neighbors. Thus, the list of neighbors is "pruned" by looking up a next-hop neighbor bit field, associated with the specific multicast group number to which the packet has been addressed. The bit field identifies the subset of neighbors (potentially including the local node) to which a copy of the packet should be delivered.

The multicast features described in the following sections are particularly well suited for "source-based" trees. Of course, the present invention applies to other types of multicasting as well.

Figure 9A:
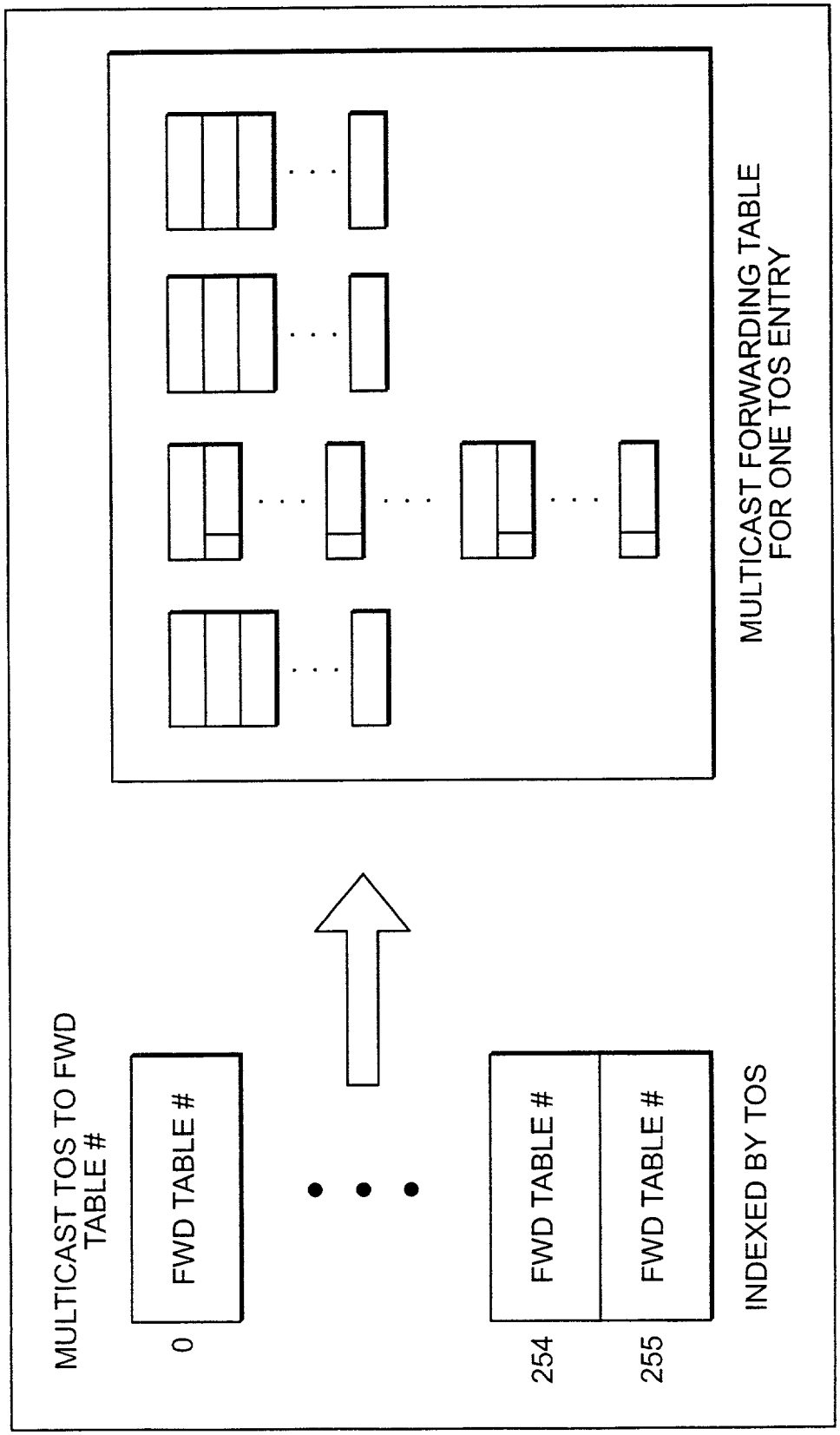
FIG. 9a is a diagram illustrating a multicast type-of-service (TOS) to forwarding table number table, and a format for a corresponding multicast forwarding table for a corresponding TOS entry.
Figure 9B:
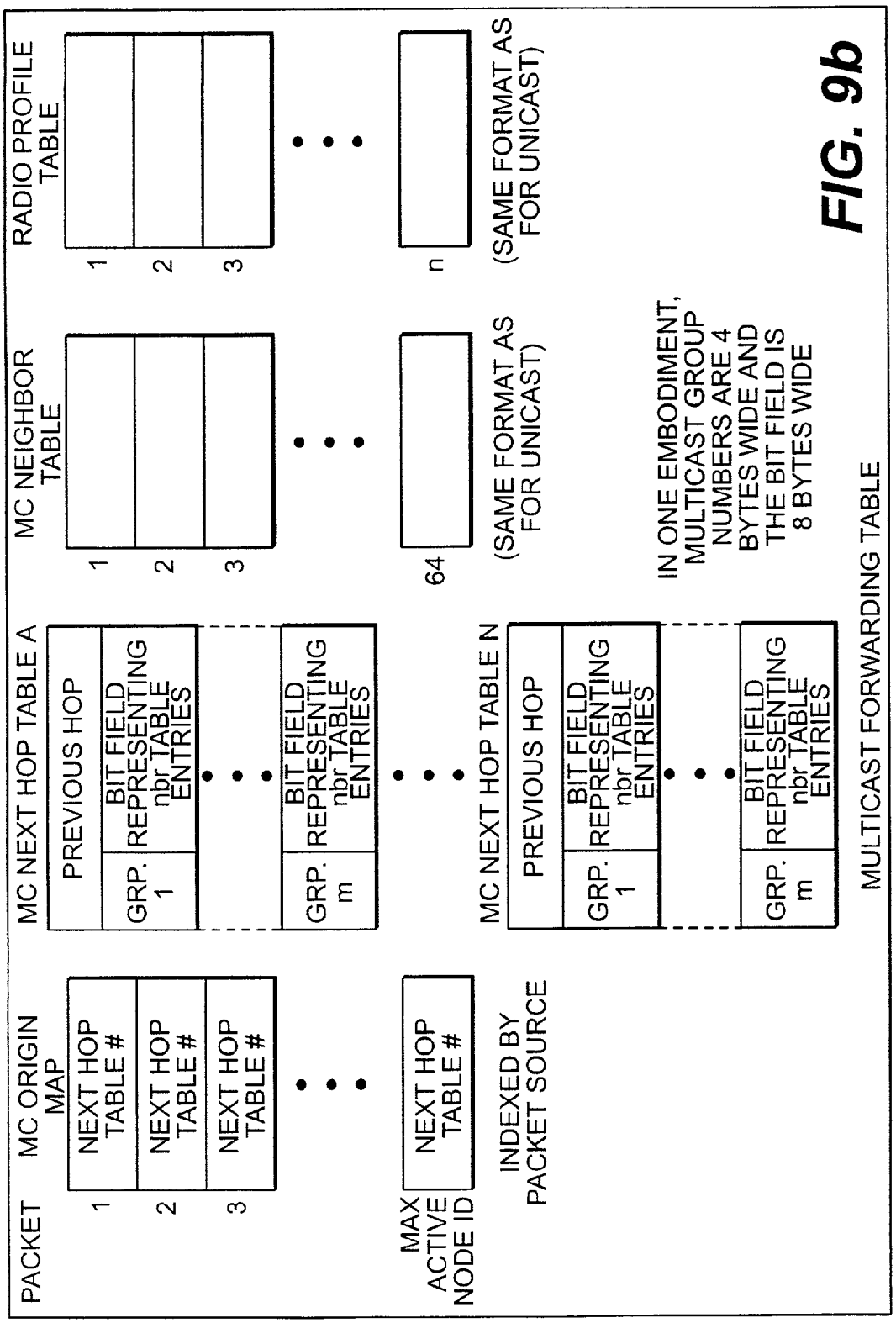

If a packet is addressed to a multicast address (e.g., a defined "group" of nodes specified by a multicast group identifier), the forwarding layer 17 will access tables maintained by the multicast routing managers 14 to obtain the information needed to forward the packet to the appropriate set of next-hop nodes. The forwarding layer 17 examines the type-of-service (TOS) bits of the packet. The forwarding layer 17 consults the TOS to multicast forwarding table number lookup table (FIG. 9a). From this, the forwarding layer 17 determines which multicast forwarding table should be used for this packet. A multicast (MC) forwarding table preferably has four components: an origin table, a set of next-hop tables, a neighbor table, and a radio-profile table (FIG. 9b). With reference to FIG. 9b, once a forwarding table has been determined, the forwarding layer 17 uses the address of the origin node to index into the associated multicast origin map table. The origin map table identifies one of a set of next-hop tables (e.g., tables A–N) included in the forwarding table to use for the particular origin node.

The next-hop table preferably includes an appropriate previous hop for this origin node. For example, the table includes a node number (or address) that corresponds to the previous hop node. The forwarding layer 17 checks this previous hop with the previous hop identified in the packet to be forwarded, and if it does not find a match, it preferably discards the packet. The mismatch indicates that the current node's forwarding database is not synchronized with that of the previous hop. If the previous hop matches, the multicast group to which the packet is addressed is looked up, and the set of next-hops for this group is retrieved from a bit field of next-hops for that group in the next-hop table. The bit field is preferably the width (in bits) of the maximum number of neighbors that are supported in the particular implementation. The neighbors which are identified by a "1" are looked up in the associated neighbor table, and a packet is sent to each neighbor in the same way unicast packets are forwarded. To support a maximum number of 64 neighbors, the bit field in the next-hop table is represented as an array of 8 bytes (eight bytes*eight bits per-byte=64 bits). The high-order bit (mask 0×80) of the first byte of the field preferably represents neighbor table index 1. The low-order bit (mask 0×01) preferably represents neighbor index 8. Likewise, the high-order bit of the second byte preferably represents neighbor table index 9, and so on. If a bit is set to "1," then a copy of the multicast packet should be sent to the neighbor specified at the corresponding neighbor table index. Of course, 8 bytes is simply one example of a family of the multicast next-hop bit field sizes. For example, 4 bytes may be chosen instead, which would allow 32 neighbors to be represented. Also, alternative procedures for identifying the set of next-hop neighbors are possible, for example, by explicitly specifying a list of numeric indices into the associated neighbor table, or reordering the bit-node characteristics as discussed.

If the current (i.e., local) node is a member of the multicast group, then the neighbor table for this multicast forwarding table should contain an entry for the current node, and its bit is set in the next-hop bit field. The radio profile index for this entry will be ignored (since the packet will be delivered locally).

Like the unicast neighbor table shown in FIG. 7, each entry in the multicast neighbor table shown in FIG. 9b preferably includes a next-hop node number (address) field (e.g., a 16-bit unsigned integer), along with a radio profile index field. Entries in the multicast neighbor table may optionally include additional data. The bit field found in the multicast next-hop table identifies the appropriate set of entries in the multicast neighbor table. Preferably, each entry in the multicast neighbor table directly specifies a next-hop node number. Also, the radio profile index number contained in the entry may be used to index into the radio profile table shown in FIG. 9b, and select a radio profile.

Preferably, multicast group numbers have a length of up to 32 bits long, and are represented as unsigned 32-bit (4 byte) integers. There may be many less groups than the numbering space allows. Hence, the numbering space is "sparse." Thus, a multicast next-hop table will generally only describe a subset of all possible multicast group numbers. There are several possibilities to address this situation. One possibility is to simply list the set of active groups, as shown in FIG. 9b. This is the table format that will be used when setting or getting a multicast next-hop table via the forwarding layer API 22. However, if the table is actually stored using this format, a linear scan of the table is typically carried out when a multicast packet is being forwarded, and this can be inefficient. Another possibility, instead, is to set up a hash table within each multicast next-hop table, in order to allow more efficient lookup of the neighbor table bit field associated with a particular multicast group number. The multicast group number that is being looked up is used to index into a hash table. Of course, other internal data structures (i.e., instead of hash tables) are possible.

The forwarding layer 17 may also use a TOS field of the subject multicast packet to index into a queuing discipline table to obtain queuing criteria in the same manner as is discussed above with respect to the forwarding of unicast packets.

Preferably, the forwarding layer 17 may delete, or a multicast routing manager 14 may delete through operations provided by the forwarding layer API 22, specific multicast forwarding tables when they determine that these multicast forwarding tables are no longer needed. This is a particularly advantageous feature for deployed mobile stations, since many multicast groups may be created while a mobile station is functioning, and some groups may not be useful beyond a finite period of time (e.g., geographic multicast groups).

The forwarding layer 17 accesses tables maintained by a broadcast routing manager 12 when a packet contains a broadcast address. As will be appreciated, there are no next-hop considerations performed, since a broadcast packet will be transmitted to every neighboring node. However, a queuing discipline and radio profile are still determined to ensure that specified service requirements are met. For example, the queuing discipline may describe a packet as an emergency broadcast or perhaps only as a periodic beacon that could be dropped, if necessary. Similarly, the radio profile could describe the broadcast as one for only a node's closest neighbors, or perhaps to as many nodes as can be reached at the moment.

Figure 14:
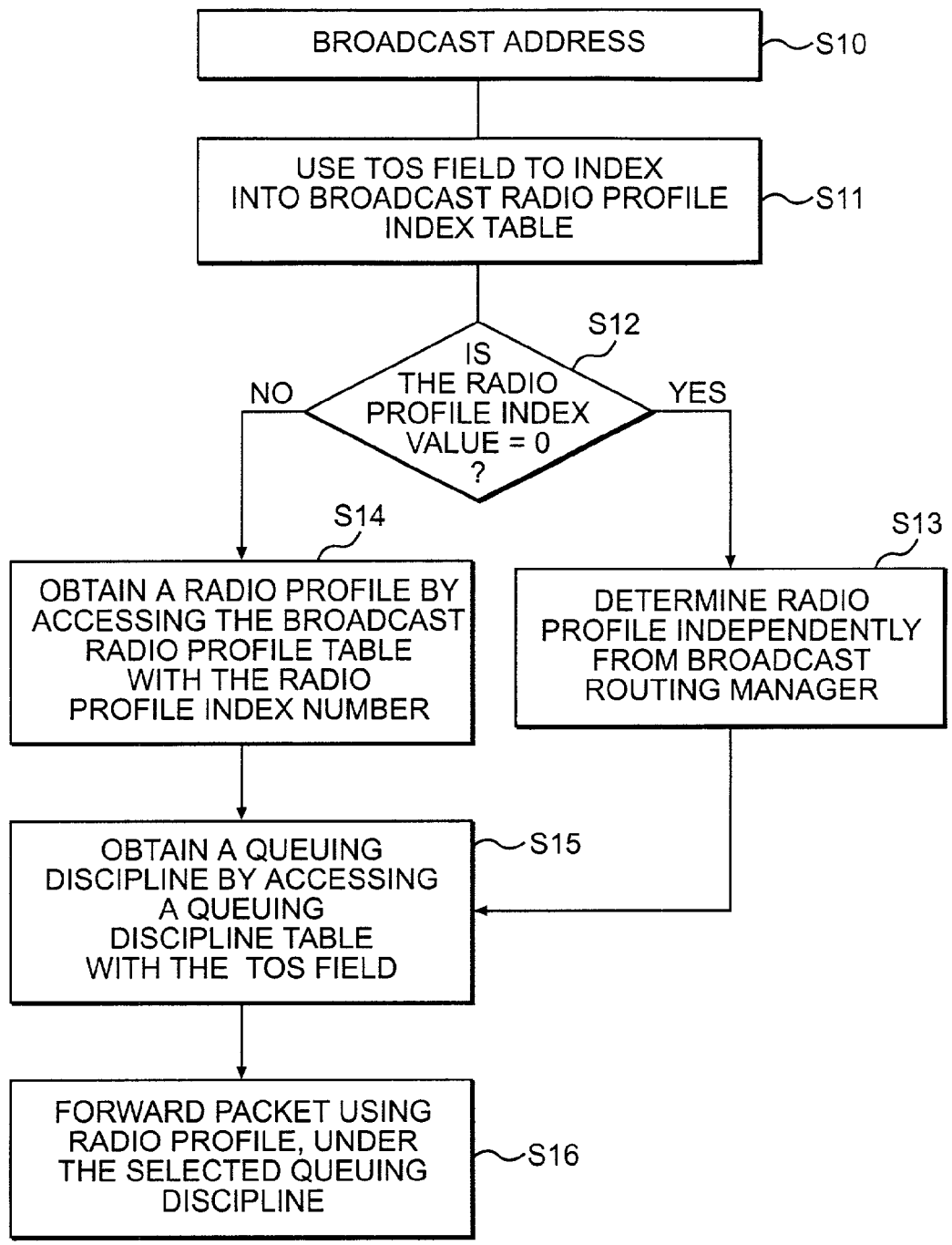
FIG. 14 is a flow diagram illustrating an operational aspect of the present invention with respect to broadcast routing.

An operational aspect of the mobile station with respect to processing packets addressed to the broadcast address will be described with reference to FIG. 14. The forwarding layer 17 recognizes that a packet has a broadcast address in step S10. To select a radio profile for a broadcast address, the forwarding layer 17 uses the packet's TOS to index into a TOS field to broadcast radio profile index table (S11). At a specified entry in the broadcast radio profile index table, the forwarding layer 17 will find a corresponding broadcast radio profile index. An example of a broadcast radio profile index table format is shown in FIG. 10.

In the broadcast radio profile index table, a radio profile index with a "0" value (S12) preferably means that the forwarding layer 17 should make its own decision about the radio profile or, alternatively, a "0" value means that the forwarding layer 17 should send the packet to the radio layer 10 with no profile. Hence, in this case, a radio profile is determined independently from a broadcast routing manager (S13). From a design perspective, the TOS field is not part of the broadcast radio profile index table. Preferably, the broadcast radio profile index table is represented as a 256-byte array of broadcast radio profile indices. The first byte in the array identifies an index into the broadcast radio profile table to be used when forwarding packets with a TOS field value of 0. The last byte in the array identifies an index into a broadcast radio profile table to be used when forwarding packets with a TOS field value of 255. As with the other TOS-related tables, a start value for the broadcast radio profile index is preferably 0.

The forwarding layer 17 preferably uses a number obtained from the broadcast radio profile index table to index into a broadcast radio profile table (not shown), and extracts the correct radio profile for the packet as is describe above with respect to unicast routing (S14).

The forwarding layer 17 also uses the TOS field to index into a queuing discipline table in the same manner as is discussed above with respect to unicast routing (S15). Information related to the packet and radio profile is then passed to the radio layer 10, being queued by the selected queuing discipline (S16). As discussed with respect to unicast routing, the forwarding layer 17 or the radio layer 10 could alternatively handle queuing responsibilities.

The individual components shown in outline or designated by blocks in FIG. 2 are all well known in the communication arts, and their specific construction and operation are not critical to the operation or best mode for carrying out the invention. Furthermore, construction and programming techniques for a multi-layer system architecture are well known in the art.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the methods, procedures and architecture described herein could be extended to wired networks. This implementation would be most appropriate for nodes having a variety of tradeoffs available for transmission capabilities and types of service created by resident applications. For example, cost, congestion and packet sender's affiliation may be used for tradeoffs in a "radio profile" like way.

Also, other traffic routing managers may be used beside those explicitly mentioned (i.e., multicast, unicast and broadcast). Furthermore, the present invention is not limited to using a combination of the three routing managers as identified in FIG. 3b, and instead could concurrently employ two different managers for the same type (or "class") of traffic (e.g., two unicast routing managers) or even a different combination of managers. If there are two (or more) routing managers of the same class, for example unicast, each will handle a disjoint subset of types-of-service. In this case, a specific unicast routing manager is not explicitly selected. Instead, a direct selection is made among all unicast forwarding tables by using the TOS to index into the unicast TOS table and select a forwarding table number. Accordingly, a class of routing managers is selected based on the destination (e.g., unicast, multicast, or broadcast) address indicator. A class may include one or more types of routing managers (e.g., 1 or more unicast managers). Furthermore, routing managers 12, 13, 14 may be implemented as any number of software modules. For example, the unicast and multicast managers may be grouped as a single module, or each routing manager may be a separate module, or more generally, any number of managers may be grouped as a single module. Alternatively, a single manager may be decomposed into two or more modules. Another alternative implementation may combine the forwarding layer and various managers (possibly including clustering 21) into a single module. Such modifications are within the scope of the present invention.

Furthermore, as will be appreciated by those skilled in the art, the methods, tables, data structures, logic and procedures, as described herein, can be readily embodied in a programmable computer or in computer executable software using known programming techniques. The software can be stored on a computer readable medium, for example, on a floppy disk, RAM, ROM, data caches, a hard disk, removable media, flash memory, memory sticks, optical mediums, magneto-optical mediums, CD-ROMs, etc.

Also, as will be appreciated by those skilled in the art, the illustrated radio profile table format could be changed based on radio capabilities, network conditions, application processing, etc. Applications and/or various routing managers can manipulate a radio profile through standardized calls and operations, which maintain system compatibility and conformity. For example, applications can determine the size of a radio profile, read and set values contained in a profile, allocate buffer memory to accommodate the profile during modification, initialize a profile, and the like, through standardized calls and operations provided by an API, in a known manner.

The radio layer 10 could also be configured to use reasonable default settings if a profile's fields are not defined or if a profile is not provided. Also, the radio layer 10 can be optionally configured to check the validity of the radio profile for a particular packet. If the radio profile has expired, or otherwise contains outdated parameters, the radio layer 10 can use default settings. The radio layer 10 can also communicate through a radio layer API 23 with the forwarding layer 17 to indicate a problem with a particular radio profile or to acknowledge successful or unsuccessful transmissions. An acknowledgement message may contain a message type identifier, an enumerated value designating either success or the reason for failure, a next-hop address from the corresponding packet message, a pointer to the packet buffer, the length of the packet buffer, the radio profile, and the length of the radio profile, for example.

Also, the radio layer 10 could generate a "packet received" message when a packet is received through the transceiver 6. This type of message could contain a message type identifier, a node address from which the packet was received, a pointer to the packet buffer that has been received, the length of the packet buffer in bytes, a "received information" block, and a length of the receive information block, in bytes. The radio layer 10 will then instruct the queuing layer 18 to enqueue this message for the forwarding layer 17. As with transmission and acknowledgement messages, a format of a receive message may be operating system-dependent. For example, one operating system-dependent detail is the format and content of the packet buffer, and the exact meaning of the associated length.

An example of a received message information block is shown in FIG. 15. As shown, this format describes reception characteristics of a received packet. For example, such characteristics may include a received signal strength indicator ("RSSI"; e.g., 16-bit integer data), frequency (e.g., 8-bit integer data), priority (e.g., 8-bit integer data), data rate (e.g., 8-bit integer data), and mode information (e.g., 8-bit integer data). Of course, there may be additional fields other than those detailed here, and also some of the fields might not be present in a particular implementation. The format also may include reserved fields for future development or system dependent parameters. One reason for providing a received information block is to allow some short fundamental information on the reception (such as a RSSI) to be quickly passed up to the application modules (or layers) without requiring them to query the radio layer database (e.g., trace records). Also, applications can manipulate these received information blocks using standardized calls and operations, e.g. as provided through an API.

As will also be appreciated, applications modules could be allowed to configure and/or control the radio layer via standardized API calls. For example, an application could receive or send information to the radio layer 10, or modify specific variables of the radio layer. Calling a designated API operation would facilitate such actions.

As will also be appreciated by those skilled in the art, the illustrated tables are merely examples of acceptable table formats. Hence, other formats could be used as long as the objectives of the present invention are realized. As will also be appreciated, one of ordinary skill in the art could write or construct a corresponding programming structure and standardized calls in view of the foregoing description of the illustrated tables and formats.

Furthermore, with respect to the discussed address format, there may be situations in which a 48-bit IEEE MAC address is used as the native node address at the radio (or transmission) layer 10. This address format is used by various known wireless and wired networking technologies. In such cases, one possibility would be for the forwarding layer 17 and the local control modules 12, 13, 14, 21 to use 48-bit node numbers as well. Of course, the 16-bit node number described earlier in this text can be smaller or larger without fundamentally changing the invention, as could the node number field in the various tables.

Having the forwarding layer 17 and local control modules 12, 13, 14, and 21 use 48-bit node numbers may, however, pose some problems. Routing update messages sent between nodes will necessarily grow significantly larger, given the increase in node number size. For the same reason, certain tables generated by the routing managers 12, 13, 14, which are made accessible to the forwarding layer 17 via the forwarding layer API 22 will grow significantly in size. Also, within the forwarding layer, directly indexed table lookups by 48-bit node number will certainly not be practical, and data structures such as hash tables would need to be employed.

Accordingly, there is a preferred alternative to using 48-bit node numbers. From the perspective of the forwarding layer API 22, the current 16-bit node numbers could be used as "nicknames" for the longer 48-bit IEEE MAC addresses. In this case, before sending a message to a next-hop neighbor via the radio layer 10, the forwarding layer 17 could access a MAC translation table (not shown) that specifies the 16-to-48 bit node number mapping. The forwarding layer 17 would then supply both the 16-bit next-hop neighbor address and the corresponding 48-bit IEEE MAC address to the radio layer 10. A significant advantage of this alternative approach is that it would preserve the base forwarding layer API 22, and also allow for more compact table representation across this API.

There are two methods that could be used to populate a MAC translation table. First, the table could be statically configured at each node with the 16-to-48 bit node number mapping for all nodes with which a node might need to communicate directly. A second method, which is preferred, is as follows: the forwarding layer 17 examines messages arriving from other nodes via the radio layer 10 (or a subset of those messages, e.g., beacons that might be periodically broadcast by each node in certain implementations). Nodes within reception range will hear the messages (e.g., beacons). Although beacons are used mainly for the benefit of local control processes such as clustering 21, they also provide the forwarding layer 17 with data to populate a MAC translation table. The forwarding layer 17 can look at both the 48-bit IEEE MAC address of the previous-hop node and at the 16-bit previous-hop node number carried along with the message, and the forwarding layer 17 can record the 16-to-48 bit mapping in a MAC translation table. In this manner, the forwarding layer 17 will automatically add an entry to a MAC translation table, whenever it directly receives a message from a new node. Thus, the forwarding layer 17 will be able to forward messages to any neighboring node from which the forwarding layer 17 has received a message. Certainly, the second method of populating a MAC translation table is significantly more flexible and dynamic, but both methods are possible embodiments of the invention.

What is claimed is:

1. A mobile communications station for use in a wireless communications network including a plurality of mobile communications stations, each station being configurable to route message packets for neighboring stations, said mobile communications station including a transceiver to transmit and receive message packets, said mobile communications station comprising:

an electronic memory circuit having network information stored thereon; and an electronic processor circuit which (i) determines a routing type for a message packet; (ii) selects a class of routing managers from a plurality of routing managers based on the determined routing type; (iii) selects at least one network table corresponding to the selected class of routing managers; (iv) selects a radio profile for the message packet; and (v) causes the message packet to be transmitted according to information contained in the network tables and radio profile.

2. A mobile communications station according to claim 1, wherein a routing type comprises one of unicast, broadcast and multicast routing.

3. A mobile communications station according to claim 2, wherein said electronic processor circuit determines a routing type based on an address indicator of the message packet.

4. A mobile communications station according to claim 3, wherein when the address indicator is a unicast address and the unicast address does not match a unicast address of said mobile communications station, said electronic processor circuit determines a type-of-service indicator of the message packet and uses the type-of-service indicator to index into a forwarding table number lookup table to select the network table.

5. A mobile communications station according to claim 4, wherein said electronic processor circuit uses the type-of-service indicator to index into a queuing table to select a queuing discipline, and causes the message packet to be processed according to the queuing discipline.

6. A mobile communications station according to claim 4, wherein the network table is comprised of a next-hop table, a neighbor table, and a radio profile table.

7. A mobile communications station according to claim 6, wherein said electronic processor circuit indexes into the next-hop table by a destination indicator of the message packet to find a corresponding neighbor index, and uses the neighbor index to index into a neighbor table, the neighbor table having one or more entries each indexed according to neighboring stations, said electronic processor circuit selecting from the neighbor table at least a radio profile index number and a neighbor address, wherein said electronic processor circuit selects the radio profile by using the radio profile index number to index into the radio profile table.

8. A mobile communications station according to claim 7, wherein the radio profile is in an opaque format.

9. A mobile communications station according to claim 3, wherein when the address indicator is a unicast address and the unicast address does not match a unicast address of said mobile communications station, said electronic processor circuit determines a type-of-service indicator of the packet and uses the type-of-service indicator to select from a table data corresponding to a queuing discipline.

10. A mobile communications station according to claim 3, wherein the network information stored in said electronic memory circuit comprises the network table including a broadcast radio profile index table having one or more entries, each entry corresponding to a radio profile index number, and a broadcast radio profile table having one or more entries, each entry corresponding to a radio profile.

11. A mobile communications station according to claim 10, where when the address indicator is a broadcast address said electronic processor circuit determines a type-of-service indicator from the packet and uses the type-of-service indicator to index into the broadcast radio profile index table to select a radio profile index number.

12. A mobile communications station according to claim 11, wherein said electronic processor circuit uses the selected radio profile index number to index into the broadcast radio profile table to select the radio profile.

13. A mobile communications station according to claim 3, wherein the network information comprises a plurality of network tables, each network table including a next-hop table, a neighbor table having node addresses and radio profile indices as entries, and a radio profile table.

14. A mobile communications station according to claim 13, wherein when the address indicator is a multicast group number, said electronic processor circuit selects the network table according to a type-of-service indicator, and uses an address of the source station of the message to identify a next-hop table to retrieve a data structure corresponding to next-hops.

15. A mobile communications station according to claim 14, wherein said electronic processor circuit uses the data structure of next-hops to index into an associated neighbor table to obtain neighbor addresses and radio profile index numbers corresponding to the multicast packet.

16. A mobile communications station according to claim 1, further comprising a metric calculator that supplies network routing information to at least one of the plurality of routing managers.

17. A mobile communications station according to claim 1, wherein said electronic processor circuit generates information regarding a received signal.

18. A mobile communications station according to claim 1, wherein said electronic memory stores a plurality of software modules and said electronic processor circuit maintains an interface between the plurality of software modules.

19. A mobile communications station which communicates among a plurality of mobile stations in a network in which stations are arranged in clusters of communication member stations, with one member station in each cluster being a head station for the cluster, each member station communicating with the network through one or more cluster head stations, the cluster head stations communicating with other cluster head stations, said mobile communications station comprising:

an electronic memory circuit having network information stored thereon; and an electronic processor circuit which (i) selects a routing manager from among a plurality of routing managers based on a type-of-service indicator associated with a message packet; (ii) selects at least one network table maintained by the selected routing manager based at least in part on a source indicator of the message packet to be transmitted; (iii) determines a transmission profile; and (iv) causes the message packet to be transmitted according to information contained in the network table and transmission profile.

20. Computer executable code stored on a computer readable medium, the code to operate a communications router to route messages in a network including a plurality of routers, each router having a multi-layered system architecture including a forwarding layer and a plurality of routing modules each of which maintains at least one network table, said computer executable code comprising:

code to direct the forwarding layer to select a class of routing modules from the plurality of routing modules based on an address indicator of a message;

code to index into at least one network table corresponding to the selected class of routing modules to obtain network information;

code to select a radio profile for the message;

code to direct the transmission of the message as specified by the network information and radio profile; and code to provide an interface at least between the forwarding layer and the plurality of routing modules.

21. In a communications system for communication among plural member communication stations in a network in which at least one of the member stations route messages for neighboring stations, each of the member stations having a multi-layered architecture including a forwarding layer, and each of the member stations having a plurality of routing managers that have access to the forwarding layer through an interface, a method of operating a communications station comprising the steps of:

selecting a class of routing managers from the plurality of routing managers based on an address indicator of a message;

selecting routing criteria for the message from information maintained by the selected class of routing managers; and transmitting the message based on the selected criteria.

22. A communications apparatus in a network for communication among a plurality of communications apparatuses, said communications apparatus routing messages for neighboring apparatuses, said communications apparatus comprising:

an electronic memory circuit having a plurality of routing managers stored thereon, each manager defining at least one network table including a plurality of entries;

an electronic processor circuit which (i) selects a class of routing managers from the plurality of routing managers stored in said electronic memory circuit based on an address indicator of a message; (ii) extracts network information from the at least one network table maintained by the selected class of routing managers; and (iii) controls transmission of the message according to the extracted network information; and a transmitter which transmits messages.

23. A wireless mobile communication station for communication among a plurality of stations in a wireless, mobile network having changing topology, said mobile station routing messages for neighboring stations, said mobile station comprising:

metric calculation means for calculating networking routing conditions; and means for transmitting packets of information, said transmitting means comprising:

forwarding means for selecting among a plurality of routing managers and for assigning forwarding information to a packet based on information maintained by a selected routing manager; and queuing means for queuing the packet for transmission.

24. A mobile communications station for use in a wireless communications network including a plurality of mobile communications stations, each station being configurable to route message packets for neighboring stations, said mobile communications station including a transceiver to transmit and receive message packets, said mobile communications station comprising:

memory means for storing network information; and processing means for (i) determining a routing type for a message packet; (ii) selecting a routing manager from a plurality of routing managers that corresponds to the determined routing type; (iii) selecting at least one network table corresponding to the selected routing manager; (iv) selecting a radio profile for the message packet; and (v) causing the message packet to be transmitted according to information contained in the network table and radio profile.

25. In a communications system for communication among a plurality of member stations in a network in which at least one of the member stations routes messages for a neighboring station, each of the member stations having a transceiver and a multi-layered architecture including a forwarding layer, and each of the member stations having a plurality of routing managers that each maintains at least one table that is made accessible to the forwarding layer via an interface, a method of operating a communications station to route messages including unicast messages, a unicast message including a type-of-service indicator and a destination indicator, said method comprising the steps of:

selecting a unicast routing manager from the plurality of routing managers when a message contains a unicast address and when the unicast address does not match an address of the communications station, the unicast routing manager maintaining a plurality of forwarding tables;

selecting a forwarding table from the plurality of forwarding tables according to the type-of-service indicator, the selected forwarding table including a next-hop table, a neighbor table, and a radio profile table;

indexing into the next-hop table by the destination indicator to find a corresponding neighbor index, and using the neighbor index to index into the neighbor table, the neighbor table having at least one entry including neighbor addresses and radio profile indices;

selecting from the neighbor table at least a radio profile index and a neighbor address, and using the selected radio profile index to select a radio profile from the radio profile table; and transmitting the message according to the selected neighbor address and the selected radio profile.

26. A method according to claim 25, wherein the radio profile is opaque with respect to the forwarding layer.

27. A method according to claim 25, wherein the multi-layered architecture includes queuing disciplines and a queuing discipline is selected based on the type-of-service indicator to queue the unicast message.

28. In a communications system for communication among a plurality of member stations in a network in which at least one of the member stations routes messages for a neighboring station, each of the member stations having a transceiver and a multi-layered architecture including a forwarding layer, and each of the member stations having a plurality of routing managers that each maintains at least one table that is made accessible to the forwarding layer via an interface, a method of operating a member station to route messages including multicast messages, a multicast message including a type-of-service indicator and an originating source indicator, said method comprising the steps of:

selecting a multicast routing manager from the plurality of routing managers when a message contains a multicast address, the multicast routing manager maintaining one or more forwarding tables;

selecting a forwarding table according to the type-of-service indicator, the selected forwarding table including an origin map table, a next hop-table, a neighbor table, and a radio profile table;

indexing into the origin map table by the originating source indicator to identify the corresponding next-hop table;

indexing into the next-hop table using the multicast address to identify the set of corresponding neighbor indices, and using the neighbor indices to index into the neighbor table, the neighbor table having the plurality of entries including neighbor addresses and radio profile indices;

selecting from the neighbor table at least one radio profile index and neighbor address, and using the selected radio profile index to select at least one corresponding radio profile from the radio profile table; and transmitting the message to the next-hop neighbor addresses according to the at least one corresponding selected radio profile.

29. A method according to claim 28, wherein the multicast address comprises a multicast group identifier.

30. A method according to claim 28, wherein the next-hop table includes a previous-hop indicator, and the multicast message includes a previous-hop indicator, and after a next-hop table has been selected, said method comprises the steps of:

comparing the previous-hop indicator in the multicast message against the previous-hop indicator of the selected next-hop table, and forwarding the message only if the previous-hop indicators match.

31. A method according to claim 28, wherein the neighbor addresses comprise an address for the member station.

32. A method according to claim 31, further comprising the step of delivering the message to the member station.

33. A method according to claim 32, wherein the message is forwarded to a component of the member station.

34. A method according to claim 33, wherein the message is forwarded to the component without a radio profile.

35. A method according to claim 28, wherein at least one radio profile is opaque with respect to the forwarding layer.

36. In a communications system for communication among a plurality of member stations in a network in which at least one of the member stations routes messages for a neighboring station, each of the member stations having a transceiver and a multi-layered architecture including a forwarding layer, and each member station having a plurality of routing managers that each maintains at least one table that is made accessible to the forwarding layer via an interface, a method of operating a communications station to route messages including broadcast messages, a broadcast message including a type-of-service indicator, said method comprising the steps of:

selecting a broadcast routing manager from the plurality of routing managers when a message contains a broadcast address, the broadcast routing manager maintaining a broadcast radio profile index table having one or more entries with each entry corresponding to a radio profile index number, and a broadcast radio profile table having one or more entries with each entry corresponding to a radio profile;

indexing into the broadcast radio profile index table by using the type-of-service indicator to select a radio profile index number;

selecting a radio profile by indexing into the broadcast radio profile table with the selected radio profile index number; and transmitting the message according to the selected radio profile.

37. A method according to claim 36, wherein the multi-layered architecture includes queuing disciplines, and a queuing discipline is selected based on the type-of-service indicator to queue the message.

38. A method according to claim 36, wherein the radio profile is opaque with respect to the forwarding layer.

39. In a communications system for communication among a plurality of member stations in a network in which at least one of the member stations routes messages for a neighboring station, each of the member stations having a transceiver and a multi-layered architecture including a forwarding layer, and each of the member stations having a plurality of routing managers that each maintains at least one table that is made accessible to the forwarding layer via an interface, a method of operating a communications station to route messages including unicast messages, a unicast message including a type-of-service indicator and a destination indicator, said method comprising the steps of:

selecting a class of unicast routing managers from the plurality of routing managers when a message contains a unicast address and when the unicast address does not match an address of the communications station, the class of unicast routing managers maintaining a plurality of forwarding tables;

selecting a forwarding table from the plurality of forwarding tables according to the type-of-service indicator, the selected forwarding table including a next-hop table, a neighbor table, and a radio profile table;

indexing into the next-hop table by the destination indicator to find a corresponding neighbor index, and using the neighbor index to index into the neighbor table, the neighbor table having at least one entry including neighbor addresses and radio profile indices;

selecting from the neighbor table at least a radio profile index and a neighbor address, and using the selected radio profile index to select a radio profile from the radio profile table; and transmitting the message according to the next-neighbor address and the selected radio profile.

40. A method according to claim 39, wherein the radio profile is opaque with respect to the forwarding layer.

41. A method according to claim 40, wherein the multi-layered architecture includes queuing disciplines and a queuing discipline is selected based on the type-of-service indicator to queue the unicast message.

42. In a communications system for communication among a plurality of member stations in a network in which at least one of the member stations routes messages for a neighboring station, each of the member stations having a transceiver and a multi-layered architecture including a forwarding layer, and each of the member stations having a plurality of routing managers that each maintains at least one table that is made accessible to the forwarding layer via an interface, a method of operating a member station to route messages including multicast messages, a multicast message including a type-of-service indicator and an originating source indicator, said method comprising the steps of:

selecting a class of multicast routing managers from the plurality of routing managers when a message contains a multicast address, the class of multicast routing managers maintaining one or more forwarding tables;

selecting a forwarding table according to the type-of-service indicator, the selected forwarding table including a an origin map table, a next hop-table, a neighbor table, and a radio profile table;

indexing into the origin map table by the originating source indicator to identify the corresponding next-hop table;

indexing into the next-hop table using the multicast address to identify the set of corresponding neighbor indices, and using the neighbor indices to index into the neighbor table, the neighbor table having the plurality of entries including neighbor addresses and radio profile indices;

selecting from the neighbor table at least one radio profile index and neighbor address, and using the selected radio profile index to select at least one corresponding radio profile from the radio profile table; and transmitting the message to the selected neighbor addresses according to the at least one corresponding selected radio profile.

43. A method according to claim 42, wherein the multicast address comprises a multicast group identifier.

44. A method according to claim 42, wherein the next-hop table includes a previous-hop indicator, and the multicast message includes a previous-hop indicator, and after a next-hop table has been selected, said method comprises the steps of:

comparing the previous-hop indicator in the multicast message against the previous-hop indicator of the selected next-hop table; and forwarding the message only if the previous-hop indicators match.

45. A method according to claim 42, wherein the neighbor addresses comprise an address for the member station.

46. A method according to claim 45, further comprising the step of delivering the message to the member station.

47. A method according to claim 46, wherein the message is forwarded to a component of the member station.

48. A method according to claim 47, wherein the message is forwarded to the component without a radio profile.

49. A method according to claim 42, wherein at least one radio profile is opaque with respect to the forwarding layer.

50. A method to determine a forwarding table which includes routing data in a communications system having a plurality of nodes, said method comprising the steps of:

identifying a type-of-service indicator, selecting a forwarding table from a plurality of forwarding tables based on the type-of-service indicator, arranging the plurality of forwarding tables in a table, and setting a subset of entries in the table of forwarding tables.

51. A method to determine a forwarding table which includes routing data in a communications system having a plurality of nodes, said method comprising the steps of:

identifying a type-of-service indicator selecting a forwarding table from a plurality of forwarding tables based on the type-of-service indicator, arranging the plurality of forwarding tables in a table, and setting different table entries in the table of forwarding tables with respective different routing managers.

52. A method of determining routing information comprising the steps of:

selecting a class of a routing manager based on an address indicator;

selecting a forwarding table based on a type-of service indicator; and selecting data to access a next-hop address and a radio profile based on a destination address.

53. A method according to claim 52, wherein the forwarding table is maintained by any one of N unicast routing managers, where N is an integer greater than 1.

54. A method according to claim 52, wherein the forwarding table is maintained by at least two unicast routing managers.

55. A method for determining addresses of nodes in a communications network, said method comprising the steps of:

accessing a MAC translation table comprising a 16-to-48 bit node number mapping; and supplying a 16-bit next-hop neighbor address and a corresponding 48-bit IEEE MAC address.

56. A method according to claim 55, wherein the neighbor address and the MAC address are supplied to a radio layer of a node in the communications system.

57. A method according to claim 56, further comprising the step of populating the MAC translation table by statically configuring each node in the communications system with the 16-to-48 bit node number mapping for all nodes with which the node communicates directly with.

58. A method according to claim 56, wherein the MAC translation table is populated according to the steps of examining messages arriving from other nodes; looking at both the 48-bit IEEE MAC address of the previous-hop node and at the 16-bit previous-hop node number contained in the message; and adding an entry to the MAC translation table when a message is received from a new node.

59. In a communications system for communication among a plurality of member stations in a network in which at least one of the member stations routes messages for a neighboring station, each of the member stations having a transceiver and a multi-layered architecture including a forwarding layer and an Internet Protocol (IP) module, a method of translating IP address numbers to node numbers comprising the steps of:

attaching the forwarding layer to the IP module as an Ethernet-class interface; and translating IP address numbers to member station numbers via an Address Resolution Protocol (ARP).

60. The method according to claim 59, wherein said translating step further comprises the steps of:

assigning each member station in the communications system an IP address, each of the member stations comprising the same IP prefix;

constructing a pseudo MAC address for each member station, the pseudo MAC address comprising an embedded 16-bit node number; and returning a pseudo MAC address when presented with an IP address for a member station.

61. A method according to claim 60, wherein the embedding is accomplished by placing the embedded 16-bit node number in at two least bytes of the pseudo MAC address;

wherein, the pseudo MAC address is 48-bits.

62. A method according to claim 60, further comprising the step of adding static entries comprising IP address-to-pseudo MAC address mappings to a local ARP cache of each member station in the communications system.

63. A method according to claim 60, further comprising the step of intercepting ARP requests as they are handed to the forwarding layer so as to locally generate ARP replies containing correct mappings.

64. A method according to claim 61, wherein for a unicast MAC address, the embedded 16-bit node number is extracted from the 48-bit pseudo MAC address.

65. A method of accessing routing data in a communications system, said method comprising the steps of:

constructing a set of tables which include non-redundant information;

constructing directly indexed tables;

linking related tables in the set of tables, and accessing routing data in at least one table of the set of tables.

66. A method of processing messages from a local control module of a member station in a communications system including a plurality of member stations, said method comprising the steps of:
- generating a message and providing the message from the control module to a forwarding layer; and
- specifying for the message: i) a unicast or broadcast next-hop address; ii) a type-of-service for the message; and iii) an identifier of a radio profile to be used when transmitting the message.

67. A method according to claim 66, wherein the radio profile identifier is used to index into a radio profile table.

68. A method according to claim 66, wherein the radio profile table is designated for messages from local control modules.

69. A method according to claim 66, wherein the type of-service is used to index into a type-of-service to queuing discipline table to retrieve queuing data.

70. A method of determining routing information comprising the steps of:
- selecting a class of a routing manager based on an address indicator;
- selecting a forwarding table based on a type-of service indicator; and
- selecting data to access a next-hop address based on a source indicator.

71. A method according to claim 70, wherein the forwarding table is maintained by any one of N multicast routing managers, where N is an integer greater than 1.

72. A method of formatting a message in a communications network, said method comprising the steps of:
- attaching data to the message, the data including forwarding information;
- marking the message as forwardable or non-forwardable; and if forwardable,
- specifying in the data a unicast node number of the originating communications node.

73. A method according to claim 72, wherein when the message is a unicast message, said method further comprises the step of specifying in the data the unicast node number of the destination to which the message is addressed.

74. A method according to claim 72, wherein when the message is a broadcast message, said method further comprises the step of specifying in the data a broadcast address as the destination to which the message is addressed.

75. A method according to claim 72, wherein when the message is a multicast message, said method further comprises the step of specifying in the data the multicast group to which the message is addressed.

76. A method according to claim 72, wherein a message header includes the data.

77. A method according to claim 72, wherein a message trailer includes the data.

* * * * *